(12) United States Patent
Vorbach et al.

(10) Patent No.: US 6,425,068 B1
(45) Date of Patent: *Jul. 23, 2002

(54) UNIT FOR PROCESSING NUMERIC AND LOGIC OPERATIONS FOR USE IN CENTRAL PROCESSING UNITS (CPUS), MULTIPROCESSOR SYSTEMS, DATA-FLOW PROCESSORS (DSPS), SYSTOLIC PROCESSORS AND FIELD PROGRAMMABLE GATE ARRAYS (EPGAS)

(75) Inventors: Martin Vorbach; Robert Münch, both of Karlsruhe (DE)

(73) Assignee: PACT GmbH, Karlsruhe (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/946,810

(22) Filed: Oct. 8, 1997

(30) Foreign Application Priority Data

Dec. 9, 1996 (DE) .......................................... 196 51 075

(51) Int. Cl.[7] ............................................... G06F 15/16
(52) U.S. Cl. .......................................... 712/18; 712/201
(58) Field of Search ................................ 395/651, 555, 395/800, 551; 713/322; 712/15, 13, 18, 201

(56) References Cited

U.S. PATENT DOCUMENTS

| | | | | |
|---|---|---|---|---|
| 4,591,979 A | * | 5/1986 | Iwashita | 364/200 |
| 4,706,216 A | | 11/1987 | Carter | |
| 4,739,474 A | * | 4/1988 | Holsztynski | 364/200 |
| 4,761,755 A | * | 8/1988 | Ardini, Jr. et al. | 364/749 |

(List continued on next page.)

FOREIGN PATENT DOCUMENTS

| | | |
|---|---|---|
| DE | 4416881.0 | 11/1994 |
| DE | 19654595 | 7/1998 |
| DE | 19654846 | 7/1998 |
| DE | 19704728 | 8/1998 |

(List continued on next page.)

OTHER PUBLICATIONS

Norman, Richard S., Hyperchip Business Summary, The Opportunity, Jan. 31, 2000, pp. 1–3.
Villasenor, John, et al., "Configurable Computing." *Scientific American*, vol. 276, No. 6, Jun. 1997, pp. 66–71.
Villasenor, John, et al., "Configurable Computing Solutions for Automatic Target Recognition," *IEEE*, 1996 pp. 70–79.
Tau, Edward, et al., "A First Generation DPGA Implementation," *FPD'95*, pp. 138–143.

(List continued on next page.)

*Primary Examiner*—Richard L. Ellis
(74) *Attorney, Agent, or Firm*—le;.5qKenyon & Kenyon

(57) ABSTRACT

An expanded arithmetic and logic unit (EALU) with special extra functions is integrated into a configurable unit for performing data processing operations. The EALU is configured by a function register, which greatly reduces the volume of data required for configuration. The cell can be cascaded freely over a bus system, the EALU being decoupled from the bus system over input and output registers. The output registers are connected to the input of the EALU to permit serial operations. A bus control unit is responsible for the connection to the bus, which it connects according to the bus register. The unit is designed so that distribution of data to multiple receivers (broadcasting) is possible. A synchronization circuit controls the data exchange between multiple cells over the bus system. The EALU, the synchronization circuit, the bus control unit, and registers are designed so that a cell can be reconfigured on site independently of the cells surrounding it. A power-saving mode which shuts down the cell can be configured through the function register; clock rate dividers which reduce the working frequency can also be set.

25 Claims, 16 Drawing Sheets

U.S. PATENT DOCUMENTS

| | | | |
|---|---|---|---|
| 4,811,214 A | * | 3/1989 | Nosenchuck et al. ........ 364/200 |
| 4,870,302 A | | 9/1989 | Freeman |
| 4,901,268 A | | 2/1990 | Judd |
| 4,967,340 A | | 10/1990 | Dawes |
| 5,014,193 A | | 5/1991 | Garner et al. |
| 5,015,884 A | | 5/1991 | Agrawal et al. |
| 5,021,947 A | | 6/1991 | Campbell et al. |
| 5,023,775 A | | 6/1991 | Poret |
| 5,043,978 A | * | 8/1991 | Nagler et al. ............. 370/58.3 |
| 5,081,375 A | | 1/1992 | Pickett et al. |
| 5,109,503 A | | 4/1992 | Cruickshank et al. |
| 5,115,510 A | * | 5/1992 | Okamoto et al. ........... 395/775 |
| 5,123,109 A | * | 6/1992 | Hillis ........................ 395/800 |
| 5,125,801 A | | 6/1992 | Nabity et al. |
| 5,128,559 A | | 7/1992 | Steele |
| 5,142,469 A | | 8/1992 | Weisenhorn |
| 5,204,935 A | | 4/1993 | Mihara et al. |
| 5,208,491 A | | 5/1993 | Ebeling et al. |
| 5,226,122 A | | 7/1993 | Thayer et al. |
| RE34,363 E | | 8/1993 | Freeman |
| 5,233,539 A | | 8/1993 | Agrawal et al. |
| 5,247,689 A | | 9/1993 | Ewert |
| 5,287,472 A | | 2/1994 | Horst |
| 5,301,344 A | | 4/1994 | Kolchinsky |
| 5,303,172 A | | 4/1994 | Magar et al. |
| 5,336,950 A | | 8/1994 | Popli et al. |
| 5,361,373 A | | 11/1994 | Gilson |
| 5,410,723 A | * | 4/1995 | Schmidt et al. ............... 712/18 |
| 5,418,952 A | | 5/1995 | Morley et al. |
| 5,421,019 A | | 5/1995 | Holsztynski et al. |
| 5,422,823 A | | 6/1995 | Agrawal et al. |
| 5,426,378 A | | 6/1995 | Ong |
| 5,430,687 A | | 7/1995 | Hung et al. |
| 5,440,245 A | | 8/1995 | Galbraith et al. |
| 5,440,538 A | | 8/1995 | Olsen et al. |
| 5,442,790 A | | 8/1995 | Nosenchuck |
| 5,444,394 A | | 8/1995 | Watson et al. |
| 5,448,186 A | | 9/1995 | Kawata |
| 5,455,525 A | | 10/1995 | Ho et al. |
| 5,457,644 A | | 10/1995 | McCollum |
| 5,473,266 A | | 12/1995 | Ahanin et al. |
| 5,473,267 A | | 12/1995 | Stansfield |
| 5,475,583 A | | 12/1995 | Bock et al. |
| 5,475,803 A | | 12/1995 | Stearns et al. |
| 5,483,620 A | | 1/1996 | Pechanek et al. |
| 5,485,103 A | | 1/1996 | Pedersen et al. |
| 5,485,104 A | | 1/1996 | Agrawal et al. |
| 5,489,857 A | | 2/1996 | Agrawal et al. |
| 5,491,353 A | | 2/1996 | Kean |
| 5,493,239 A | | 2/1996 | Zlotnick |
| 5,497,498 A | | 3/1996 | Taylor |
| 5,506,998 A | | 4/1996 | Kato et al. |
| 5,510,730 A | | 4/1996 | El Gamal et al. |
| 5,511,173 A | | 4/1996 | Yamaura et al. |
| 5,513,366 A | | 4/1996 | Agarwal et al. |
| 5,521,837 A | | 5/1996 | Frankle et al. |
| 5,522,083 A | | 5/1996 | Gove et al. |
| 5,532,693 A | | 7/1996 | Winters et al. |
| 5,532,957 A | | 7/1996 | Malhi |
| 5,535,406 A | | 7/1996 | Kolchinsky |
| 5,537,057 A | | 7/1996 | Leong et al. |
| 5,537,601 A | | 7/1996 | Kimura et al. |
| 5,541,530 A | | 7/1996 | Cliff et al. |
| 5,544,336 A | | 8/1996 | Kato et al. |
| 5,548,773 A | | 8/1996 | Kemney et al. |
| 5,555,434 A | | 9/1996 | Carlstedt |
| 5,559,450 A | | 9/1996 | Ngai et al. |
| 5,561,738 A | | 10/1996 | Kinerk et al. |
| 5,570,040 A | | 10/1996 | Lytle et al. |
| 5,583,450 A | | 12/1996 | Trimberger et al. |
| 5,586,044 A | | 12/1996 | Agrawal et al. |
| 5,587,921 A | | 12/1996 | Agrawal |
| 5,588,152 A | | 12/1996 | Dapp et al. |
| 5,590,345 A | | 12/1996 | Barker et al. |
| 5,596,742 A | | 1/1997 | Agarwal et al. |
| 5,617,547 A | | 4/1997 | Feeney et al. |
| 5,634,131 A | * | 5/1997 | Matter et al. ............... 395/750 |
| 5,652,894 A | * | 7/1997 | Hu et al. .................... 395/750 |
| 5,655,124 A | * | 8/1997 | Lin ....................... 395/750.04 |
| 5,717,943 A | * | 2/1998 | Barker et al. ............... 395/800 |
| 5,734,921 A | * | 3/1998 | Dapp et al. ................. 395/800 |
| 5,742,180 A | | 4/1998 | Detton |
| 5,748,872 A | | 5/1998 | Norman |
| 5,754,871 A | * | 5/1998 | Wilkinson et al. .......... 395/800 |
| 5,761,484 A | | 7/1998 | Agarwal et al. |
| 5,778,439 A | | 9/1998 | Timberger et al. |
| 5,801,715 A | | 9/1998 | Norman |
| 5,828,858 A | | 11/1998 | Athanas |
| 5,838,165 A | | 12/1998 | Chatter |
| 5,867,691 A | | 4/1999 | Shiraishi |
| 5,892,961 A | | 6/1999 | Trimberger et al. |
| 5,915,123 A | | 7/1999 | Mirsky et al. |
| 5,936,424 A | | 9/1999 | Young et al. |
| 5,927,423 A | | 10/1999 | Wada et al. |
| 5,956,518 A | | 1/2000 | DeHon et al. |
| 6,014,509 A | | 4/2000 | Furtek et al. |
| 6,052,773 A | | 4/2000 | DeHon et al. |
| 6,054,873 A | | 8/2000 | Laramie |
| 6,108,760 A | | 9/2000 | Mirsky et al. |
| 6,122,719 A | | 9/2000 | Mirsky et al. |
| 6,127,908 A | | 10/2000 | Bozler et al. |

FOREIGN PATENT DOCUMENTS

| | | |
|---|---|---|
| DE | 19651075 | 10/1998 |
| EP | 0 221 360 | 5/1987 |
| EP | 0428327 A1 | 5/1991 |
| EP | 748 051 A2 | 12/1991 |
| EP | 0539595 A1 | 5/1993 |
| EP | 0 678 985 | 10/1995 |
| EP | 0707269 A1 | 4/1996 |
| EP | 0 726 532 | 8/1996 |
| EP | 735 685 | 10/1996 |
| EP | 0735685 | 10/1996 |
| EP | 0748051 A2 | 12/1996 |
| EP | 726532 | 8/2000 |
| WO | 90/04835 | 5/1990 |
| WO | WO90/11648 | 10/1990 |
| WO | 93/11503 | 6/1993 |
| WO | 94/08399 | 4/1994 |
| WO | 95/00161 | 1/1995 |
| WO | 95/26001 | 9/1995 |

OTHER PUBLICATIONS

Athanas, Peter, et al., "IEEE Symposium on FPGAs For Custom Computing Machines," *IEEE Computer Society Press*, Apr. 19–21, 1995, pp. i–vii, 1–222.

Bittner, Ray, A., Jr., "Wormhole Run–Time Reconfiguration: Conceptualization and VLSI Design of a High Performance Computing system," *Dissertation*, Jan. 23, 1997, pp. i–xx, 1–415.

Myers, G., Advances in Computer Architecture, Wiley–Interscience Publication, 2nd ed., John Wiley & Sons, Inc. pp. 463–494, 1978.

M. Saleeba, "A Self–Contained Dynamically Reconfigurable Processor Architecture", Sixteenth Australian Computer Science Conference, ASCS–16, QLD, Australia, Feb., 1993.

M. Morris Mano, "Digital Design," by Prentice Hall, Inc., Englewood Cliffs, New Jersey 07632, 1984, pp. 119–125, 154–161.

Maxfield, C. "Logic that Mutates While–U–Wait" EDN (Bur. Ed) (USA), EDN (European Edition), Nov. 7, 1996, Cahners Publishing, USA.

* cited by examiner

0-REG

O-REGsft

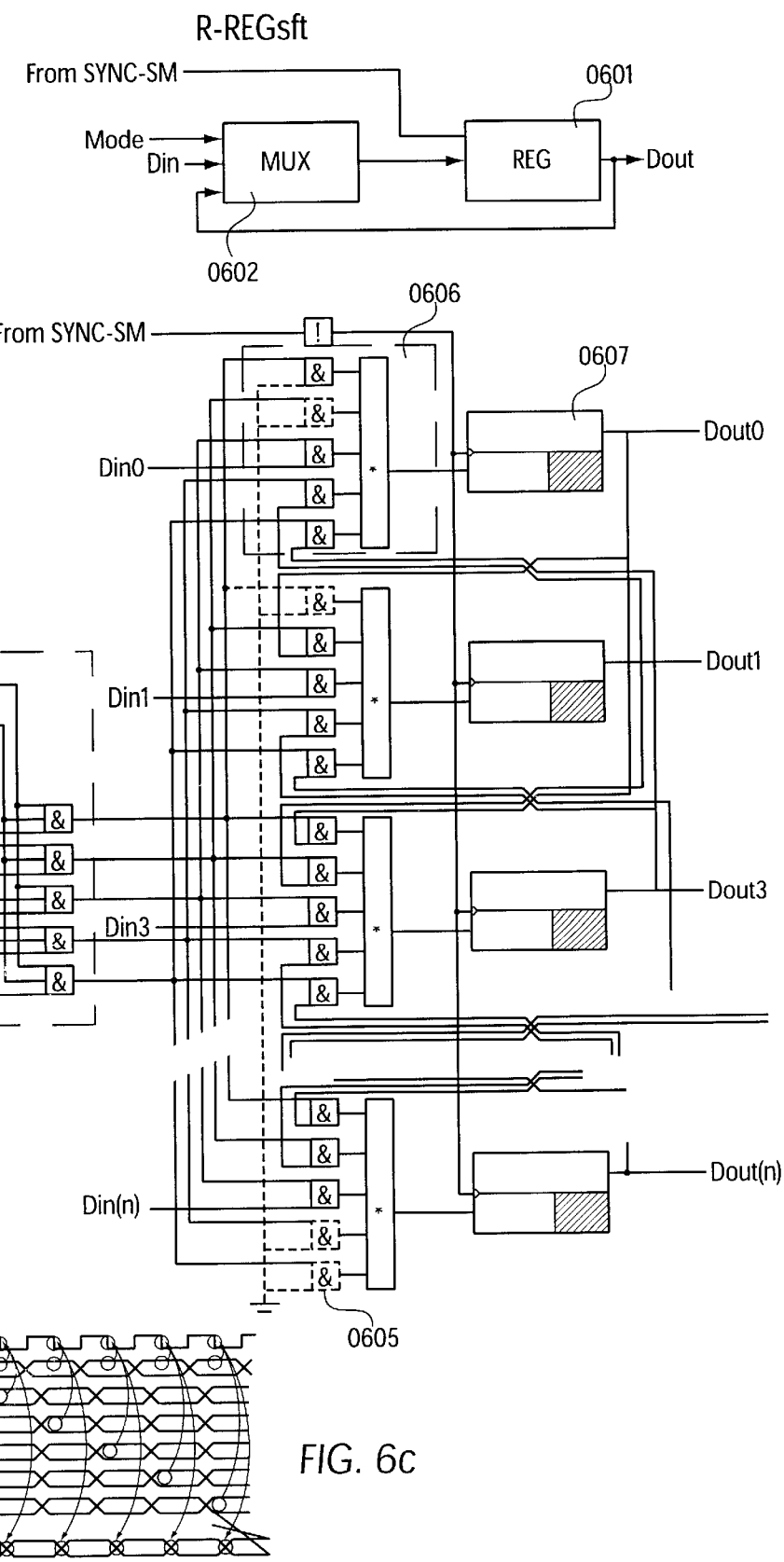

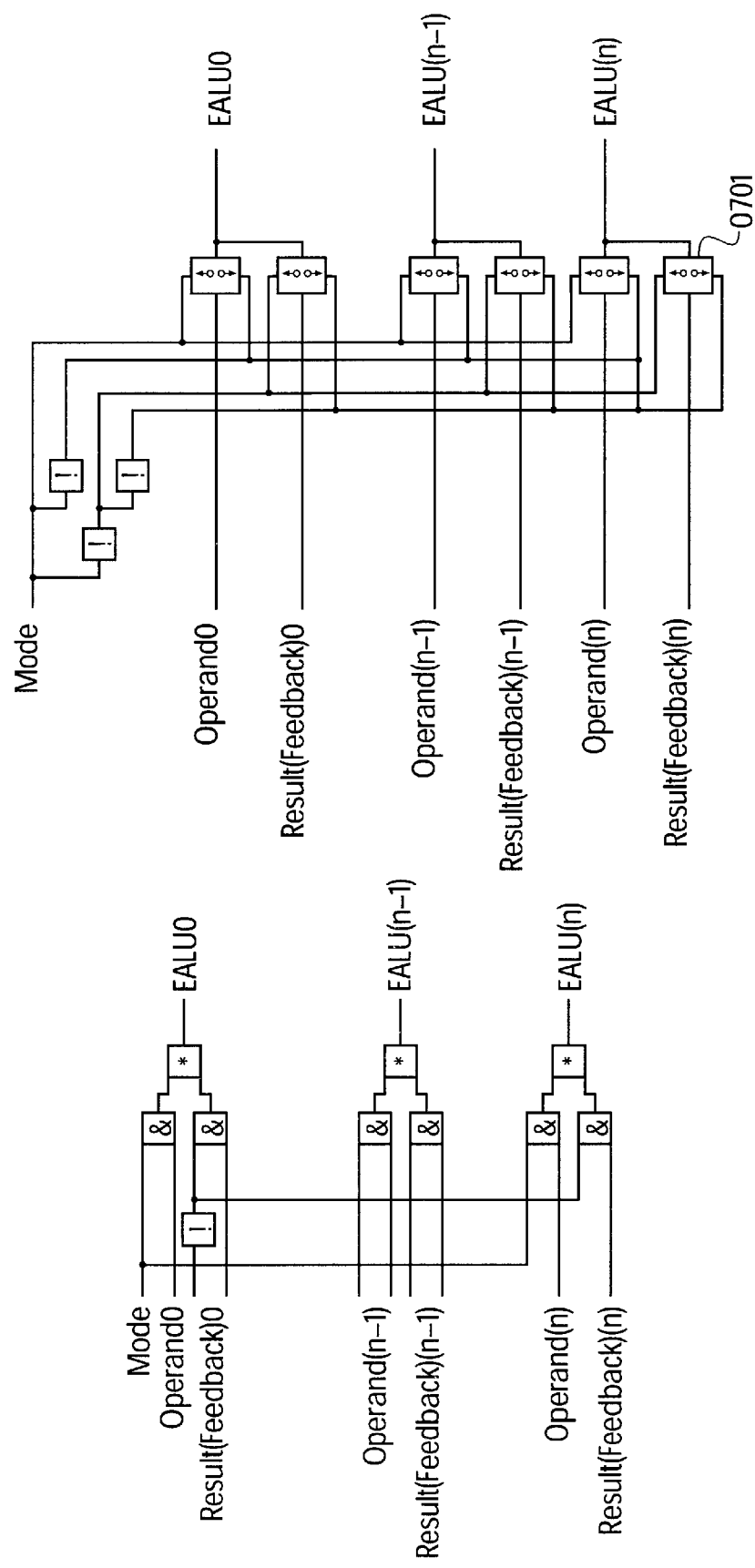

UNIT FOR PROCESSING NUMERIC AND LOGIC OPERATIONS FOR USE IN CENTRAL PROCESSING UNITS (CPUS), MULTIPROCESSOR SYSTEMS, DATA-FLOW PROCESSORS (DSPS), SYSTOLIC PROCESSORS AND FIELD PROGRAMMABLE GATE ARRAYS (EPGAS)

FIELD OF THE INVENTION

The present invention is directed to a unit for processing numeric and logic operations.

BACKGROUND INFORMATION

German Published Patent No. Appln. DE 44 16 881 A1 describes a method of processing data, where homogeneously arranged cells which can be configured freely in function and interconnection are used.

Independently of the above-mentioned publication, FPGA (field programmable gate array) units are being used to an increasing extent to assemble arithmetic and logic units and data processing systems from a plurality of logic cells.

Another known method is to assemble data processing systems from fixed program-controlled arithmetic and logic units with largely fixed interconnections, referred to as systolic processors.

Units according to the method described in DE 44 16 881 A1 (referred to below as VPUs) are very complicated to configure owing to the large number of logic cells. To control one logic cell, several control bits must be specified in a static memory (SRAM). There is one SRAM address for each logic cell. The number of SRAM cells to be configured is very large, which requires a great deal of space and time for configuring and reconfiguring such a unit. The great amount of space required is especially problematical because the processing power of a VPU increases with an increase in the number of cells. However, the area of a unit that can be used is limited by chip manufacturing technologies. The price of a chip increases approximately proportionally to the square of the chip area. It is impossible to broadcast data to multiple receivers simultaneously because of the repeated next-neighbor interconnection architecture. If VPUs are to be reconfigured on site, it is absolutely essential to achieve short reconfiguration times. However, the large volume of configuration data required to reconfigure a chip stands in the way of this. There is no possibility of separating cells from the power supply or having them cycle more slowly to minimize the power loss.

In the field of processing numeric and logic operations, FPGAs comprise multiplexers or look-up table (LUT) architectures. SRAM cells are used for implementation. Because of the plurality of small SRAM cells, they are very complicated to configure. Large volumes of data are required, necessitating a comparably large amount of time for configuration and reconfiguration. SRAM cells take up a great deal of space. However, the usable area of a unit is limited by the chip manufacturing technologies. Here again, the price increases approximately proportionally to the square of the chip area. SRAM-based technology is slower than directly integrated logic due to the SRAM access time. Although many FPGAs are based on bus architectures, there is no possibility of broadcasting for rapid and effective transmission of data to multiple receivers simultaneously. If FPGAs are to be reconfigured on site, it is absolutely essential to achieve short configuration times. However, the large volume of configuration data required stands in the way. FPGAs do not offer any support for reasonable on-site reconfiguration. The programmer must ensure that the process takes place properly without interfering effects on data and surrounding logic. There is no intelligent logic to minimize power loss. There are no special function units to permit feedback on the internal operating states to the logic controlling the FPGA.

Reconfiguration is completely eliminated with systolic processors, but these processors are not flexible because of their rigid internal architecture. Commands are decoded anew in each cycle. As already described in the previous sections, there are no functions which include broadcasting or efficient minimization of power loss.

SUMMARY OF THE INVENTION

The present invention comprises a cascadable ALU which is configurable in function and interconnection. No decoding of commands is needed during execution of the algorithm. The present invention can be reconfigured on site without any effect on surrounding ALUs, processing units, or data streams. The volume of configuration data is very small, which has positive effects on the space required and the configuration speed. Broadcasting is supported through the internal bus systems in order to distribute large volumes of data rapidly and efficiently. The ALU is equipped with a power-saving mode to shut down power consumption completely. There is also a clock rate divider which makes it possible to operate the ALU at a slower clock rate. Special mechanisms are available for feedback on the internal states to the external controllers.

The present invention describes the architecture of a cell in the sense of German Patent DE 44 16 881 A1 or known FPGA cells. An expanded arithmetic and logic unit (EALU) with special extra functions is integrated into this cell to perform the data processing. The EALU is configured by a function register, which greatly reduces the volume of data required for configuration. The cell can be cascaded freely over a bus system, the EALU being decoupled from the bus system over input and output registers. The output registers are connected to the input of the EALU to permit serial operations. A bus control unit is responsible for the connection to the bus, which it connects according to the bus register. The unit is designed so that distribution of data to multiple receivers (broadcasting) is possible. A synchronization circuit controls the data exchange between multiple cells over the bus system. The EALU, the synchronization circuit, the bus control unit and registers are designed so that a cell can be reconfigured on site independently of the cells surrounding it. A power-saving mode which shuts down the cell can be configured through the function register; clock rate dividers which reduce the working frequency can also be set.

BRIEF DESCRIPTION OF THE DRAWINGS

FIG. 6 illustrates an architecture of an R-REGsft provided with a right/left 1-2 bit barrel shifter.

FIG. 7 illustrates an architecture of the R20-MUX and implementation of a MUX in transfer gate technology.

DETAILED DESCRIPTION OF THE INVENTION

Figure 1:
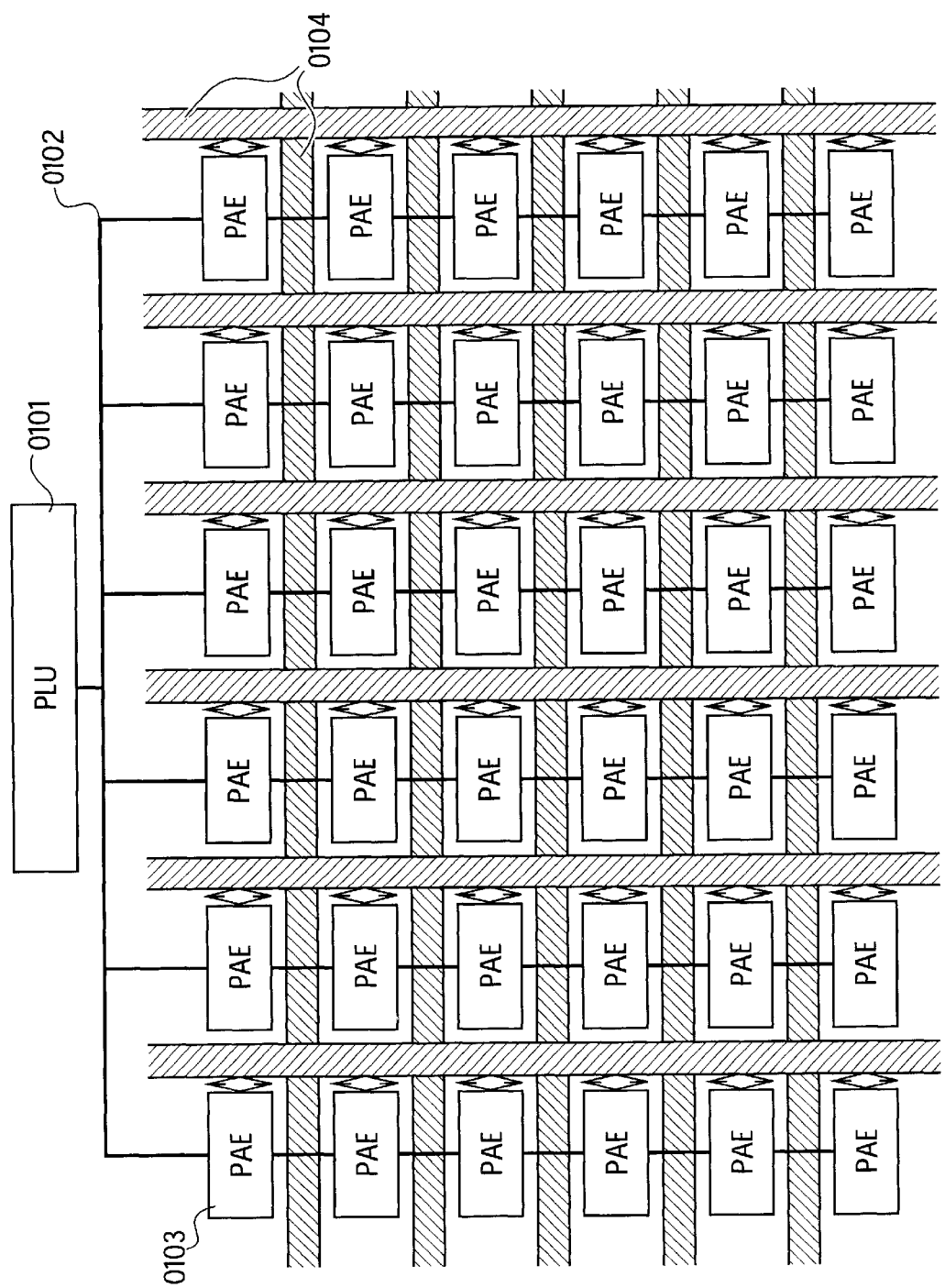
FIG. 1 illustrates an arrangement of several PAEs that form one PA, which is coupled with a PLU and which is without connection to input/output systems or memories.

The present invention relates to the design of a cell (PAE=processing array element) in the sense of DE 44 16 881 A1 or known FPGA cells, where the PAEs can be cascaded to form an array (processing array=PA). One PAE is composed of a plurality of function units.

The ALU consists of an expanded arithmetic and logic unit EALU permanently implemented in the logic unit. An EALU is an ordinary known arithmetic and logic unit (ALU) which has been expanded by special functions such as counters. This EALU is capable of performing a plurality of arithmetic and logic operations, which do not have to be specified here exactly, because it is possible to refer to known ALUs. The EALU has direct access to its own results (described below as the operand) which are returned. Thus, counters or serial operations such as serial multiplication, division, or series expansion are possible. In addition to its result, the EALU delivers the signals CarryOut-AlessB and AequalB-0detect. CarryOut-AlessB specifies either the carry-over in arithmetic operations, or, in comparisons by means of subtraction of two values, it specifies the carry-over, i.e., CarryOut-AlessB, that A<B or B<A, depending on the operand negated. The signal is the usual carry-over generated by a full adder. AequalB-0detect specifies that the result in the result register R-REGsft is zero. The signal is generated by a NOR element from the result. The signals are used for simple analysis of states and can be returned to the PLU. Additional status signals can be implemented, depending on the application.

The function of the EALU is configured in a function register (F-PLUREG).

O-REG: The input operands of the EALU are stored in two independent operand registers (O-REG). They are thus available independently of the status of the unit supplying the data (data transmitter). This is necessary to permit decoupling from the bus and for the PAs to be freely reconfigurable. One or both O-REGs have a shift function. If required, the shift function of each O-REG may be triggered by the EALU on an individual basis. The shift function makes it possible to perform serial operations such as serial multiplication or division in the EALU. O-REGsft denotes O-REGs with a shift function.

O-REGsft: The result of the EALU is stored in a result register (R-REGsft.) This provides time independence of the unit or units receiving the result (data receivers). The R-REGsft has a shift function which is triggered by the EALU, thus permitting serial operations.

R20 MUX: The result data available in R-REGsft is introduced as an operand through a multiplexer (R20-MUX) between one of the O-REGs and the EALU to guarantee feedback of results for serial operations, counters, and similar functions. The multiplexer is set by the F-PLUREG.

clock cycles: It is appropriate but not absolutely necessary to trigger the O-REG sft at a clock pulse edge and the R-REGsft at the subsequent negated clock pulse edge. Thus, the EALU has a half clock pulse available to carry out its function; the second half clock pulse is available for signal propagation times and multiplexers. Thus it is possible to perform a complete operation in each clock pulse.

State Machine, SM unit: An SM UNIT is available for sequence control in the EALU. The SM unit controls the O-REG and R-REGsft and their shift function as well as controlling R20-MUX. Consequently, serial operations, along with shift and counting functions, can be performed readily by the EALU. The state machine may be implemented according to any suitable conventional method.

Sync UNIT: A synchronization unit (sync UNIT) is provided for synchronization of one PAE in an array (PA) of PAEs. The sync UNIT analyzes a series of input signals, which execute a handshake protocol. rACK(h/l):The data receiver acknowledges the data received, the term rACKh being the acknowledgment of the high result byte (bits 8 through 15), and the term rACKl being the acknowledgment of the low result byte (bits 0 through 7). The two acknowledgments are linked with an AND (rACKh AND rACKl) and yield the signal rACK. rACK is not true while one or both data receivers are busy processing their data and becomes true when the processing of the data of both data receivers is concluded, and the result is stored in the R-REGsft of the respective data receiver. The rACK(h/l) signals are often considered below in their AND-linked form as rACK (=rACKh & rACKl).

oRDY(½):The data transmitter signals its readiness to send new data. oRDY is not true while the data transmitter is busy processing its data, and it becomes true when the result of the data transmitter, which is the operand of the PAE, is available. oRDY1 is the enable signal of the data transmitter of the first operand, and oRDY2 is that of the second. The two are linked with an AND (oRDY1 AND oRDY2) and yield the oRDY signal. oRDY is true only when both data transmitters are ready to send data. The oRDY(½) signals are often considered below in their AND-linked form as oRDY (=oRDY1 & oRDY2).

Output signals generated from the input signals and the status of the sync UNIT which, together with the sequence control of the EALU, represent the overall status of the PAE; those output signals are in turn regarded as input signals by the sync UNITs of the data transmitters and receivers. Status information and the F-PLUREG register are used for sequence control of the EALU.

rDY:,rDY indicates that the PAE has finished its data processing and a result is available in R-REGsft. rRDY is transmitted as rRDYh and rRDYl to both data receivers. However, it is the same signal in each case. oACK:The signal oACK indicates that the PAE has processed its operands and can receive new data in O-REG(sft). oACK is transmitted as oACK1 and oACK2 to both data transmitters. However, it is the same signal in each case.

The RDY signals retain their level up to the input of the acknowledgment through ACK. This is necessary when the data receiver is reconfigured while the data are being made available. If RDY is applied until acknowledged through ACK, the data receiver will recognize after the reconfiguration that data is available and will accept it.

The linking of the signals over multiple PAEs is as follows:

Data transmitter　　PAE　　Data receiver
rRDY→oRDY　　rRDY→oRDY
rACK←oACK　　rACK←oACK

This means that the output signal rRDY of the data transmitter, for example, represents the input signal oRDY1 or oRDY2 of PAE. The output signal rRDY of PAE is the input signal oRDY of the data receiver. The sync UNIT has the following types of sequences:

| Mode | Description | Comments |
| --- | --- | --- |
| Wait OP | The PAE waits for operands | Only if no multiple-cycle operation is taking place |
| Cycle 1 | A single-cycle operation is being carried out | Operands are acknowledged |
| Cycle n | One cycle of a multiple-cycle operation is being carried out | — |
| Cycle Z | The last cycle of a multiple-cycle operation is being carried out | Operands are acknowledged |
| Wait ERG | The PAE waits for acknowledgment of the result | Only if a preceding result exists |
| Stop | Stops execution after conclusion of the current cycle, then acknowledges ReConfig if the result has also been acknowledged | — |

The sync UNIT makes available a special mode which enables the clock signal only when operands are available. This mode is appropriate especially when the data transmitters do not supply the data in each clock pulse of the processor but instead only in every $n^{th}$ clock pulse. Then the clock cycle corresponds to one period of the normal clock cycle and is enabled through rACK or oRDY(½). The enable is referred to as OneShot. This mode is called the OneShot MODE. The clock pulse is AND-linked with one of the enable signals through an AND gate. The mode and signal selection take place through F-PLUREG. The enable signal generated through rACK or oRDY(½) can be lengthened by the SM UNIT. This is necessary so that operations which need more than one cycle can be carried out in one-shot MODE. To make this possible, a corresponding signal line of the SM UNIT is OR-linked to the enable signal.

If the registry entry STOP is set in F-PLUREG, the sync UNIT runs the current function to the end. Thereafter, no more operands are accepted or acknowledged. As soon as rACK indicates that the result has been accepted by the data receiver, the readiness of the PLU for reconfiguration is indicated by the ReConfig signal. The signal is generated when rACK stores the stop of F-PLUREG in a D flip-flop. ReConfig can be polled by read access of the PLU to F-PLUREG at the stop bit position.

Likewise, the sync UNIT can be used to generate and analyze error states or other status signals.

To apply the operands and the result to the external bus systems, there is a bus multiplex unit (BM UNIT). It consists of two multiplexers and two gates. The two multiplexers are for the operands (O-MUX), and the two gates for the result (R-GATE), and one switch is for the higher-order result, and the other is for the low-order result. The multiplexers and switches are controlled over the multiplexer register (M-PLUREG). The sync UNIT signals are controlled over the switches to the bus. The correlation of the multiplexers/switches and signals is as follows:

O-MUX1:oRDY1, oACK
O-MUX2:oRDY2, oACK
RH-GATE:rRDY, RACKh
RL-GATE:rRDY, rACKl

The R-GATE can be brought by M-PLUREG to a state in which it does not drive a bus system.

The table gives a description of the signals and their respective interface architecture:

| Signal | oRDY | oACK | rRDY | rACK | D7-0 |
| --- | --- | --- | --- | --- | --- |
| Indicates | operands ready | operands acknowledged | result ready | result acknowledged | data |
| Type | input | open collector | driver | input | bidirectional |

It is possible to operate several data receivers from one data transmitter (broadcasting). To do so, several data receivers are connected to the same bus. To guarantee acknowledgment of the data, the driver stage of the acknowledgment line oACK is designed as an open collector driver. The bus operates as a wired AND, i.e., only when all data receivers have acknowledged the data does the H level (logic 1 level, depending on the technology used) required for the acknowledgment occur. This is accomplished by the fact that this data receiver which does NOT acknowledge the data pulls the bus to an L level (logic 0 level, depending on the technology used) over an open collector transistor. Data receivers which acknowledge the data do not trigger the open collector transistor and thus add no load to the bus. When all the data receivers have acknowledged the data, there is no more load on the bus and it assumes an H level via a pull-up resistor.

State-back UNIT: The PAE is capable of supplying feedback about its operating state to its primary logic unit (program load unit), hereinafter called PLU (see DE 44 16 881 A1). The primary logic unit configures the PA and requires information about the status of the individual PAEs in order to be able to perform appropriate reconfigurations, which is done through the StateBack UNIT. This transmits either the lower 3-bit of the result from the R-REGsft—to deliver calculated values to the PLU—or the CarryOut-AlessB and AequalB-0detect signals to a 3-bit status bus, depending on the entry in the F-PLUREG. To allow signals to be impressed from several PAEs, a simple wired-OR method over open collector drivers is used. In order for the reconfiguration of the PAE to begin only when the receiver has acknowledged the data, a latch unit can be inserted between the signals and the open collector drivers to enable the signals only after receipt of rACK. The status bus is monitored by the PLU, which reacts by its program flow and reconfiguration to the status supplied by the bus.

Power Unit: The PAE has a power-saving mode (sleep MODE) which, like the function of the EALU, is set in F-PLUREG. There is a bit for this which, when set, starts the sleep MODE. To do so, either the clock line of the PAE is set at a constant logic 0 or 1, or the voltage of the PAE is turned off via a transistor. F-PLUREG is always energized within the PAE and cannot be switched off. Unused areas (gates) of the PAE for the function executed are switched off by analysis of the F-PLUREG. This is done through a transistor which isolates those areas from the power supply. To prevent unwanted interference, the outputs of the areas are defined over pull-up/pull-down resistors.

In addition, the power save MODE can also be used within the one-shot MODE, which is controlled by the sync UNIT. All parts of the PAE, except the F-PLUREG, M-PLUREG, and sync UNIT are isolated from the power supply. Only when the sync UNIT senses a one-shot mode are all the required PAE parts connected over the power UNIT. The sync UNIT delays the clock signal until all the newly connected parts are capable of functioning.

Registers: The F-PLUREG and M-PLUREG registers are connected to the PLU bus. The addresses of the data packages sent by the PLU are decoded in a comparator. If the address of the PAE is recognized, the data is stored in the registers. The PLU bus has the following architecture:

AX7-0:X address of the X/Y matrix
AY7-0:Y address of the X/Y matrix
RS:Register select; logic 0 selects F-PLUREG, logic 1 selects M-PLUREG
AEN:Address enable; the bus contains a final address. The addresses must be decoded as long as AEN is logic 0. AEN is logic 0 during the entire bus access, i.e., also during the data transmission.
D23-00:Data
DEN:Data enable; the bus contains final data. The data must be transferred to the register at the rising edge of the DEN signal.
OEN:Output enable; the PLU reads valid data out of the PLUREGs.

Architecture of F-PLUREG

1. The architecture of the register in write access:

| F11 | F10–9 | F8 | F7–6 | F5 | F4–0 |
|---|---|---|---|---|---|
| Stop | state-back | sleep | one shot | power save | EALU function |

The functions of the individual bits:

| Function | State | Effect |
|---|---|---|
| Stop | 0 | Normal function |
| | 1 | Stop functions after current cycle, no acknowledgment of the operands |
| State-back | 00 | No feedback, bus open |
| | 01 | D2-0 to bus |
| | 10 | CarryOut-AlessB, AequalB-0detect to bus |
| | 11 | Illegal |
| Sleep | 0 | No function, de-energized |
| | 1 | Normal function, energized |
| One shot | 00 | Normal function |
| | 01 | One-shot to oRDY1 |
| | 10 | One-shot to oRDY2 |
| | 11 | One-shot to (rACKh & rACKl) |
| Power save | 0 | No power save |
| | 1 | Power-saving mode in combination with one-shot mode |
| EALU function | 00000 | No operation (NOP) |
| | 00001 | |
| | ... | Function according to design of the EALU |
| | 11111 | |

The reset state is 0 in all bits.

2. Register architecture in read access:

| F11 |
|---|
| ReConfig |

The functions of the individual bits:

| Function | State | Effect |
|---|---|---|
| Reconfig | 0 | No reconfiguration possible |
| | 1 | Reconfiguration possible |

The reset state is 0 in all bits.
Architecture of M-PLUREG

| M23–18 | M17–12 | M11–06 | M05–00 |
|---|---|---|---|
| High-order result | Low-order result | Operand 1 | Operand 0 |

The values $M(n+5)-.n=000000$, $n \in \{0,6,12,18\}$ mean that the multiplexers/switches are open and have no bus contact. It may be appropriate to block M-PLUREG via the ReConfig signal, i.e., as soon as ReConfig is activated, PAE disconnects from all bus systems. The reset status is 0 in all bits.

The function of PAE can be configured and reconfigured more easily and quickly than in known technologies, in particular the FPGA technology. The interconnection of the ALU is specified in M-PLUREG, whereas in the traditional technologies a plurality of individual unrelated configuration bits must be occupied. The transparent architecture of the registers simplifies (re)configuration.

Due to the direct design as an ALU, the PAE requires less space than in traditional technologies where ALUs have been implemented by a plurality of logic cells. At the same time, the run delays are lower and the attainable clock frequencies are higher accordingly.

A broadcasting function is guaranteed due to the design of the BM UNIT, and acknowledgment is automatic. A data transfer that is largely independent in time is guaranteed due to the input and output registers (O-REG, R-REG).

Configuration and reconfiguration are greatly simplified due to the decoupling of each PAE from the overall system through the O-REG and R-REG registers since the individual PAEs are largely independent of one another. Feedback to the PLU as well as the interaction of STOP and ReConfig permit efficient control of (re)configuration.

Power-saving functions have been implemented which lead to a reduction in power consumption—automatically to some extent (one-shot MODE).

The PAE architecture can be implemented in the FPGAs to increase their efficiency. Arithmetic operations can thus be implemented much more efficiently.

FIG. 1 shows a simplified processor according to DE 44 16 881 A1. The PLU (0101) and its bus system (0102) are shown. The PAEs (0103) are shown as an array, and the internal bus system (0104) in the chip is indicated schematically.

Figure 2:
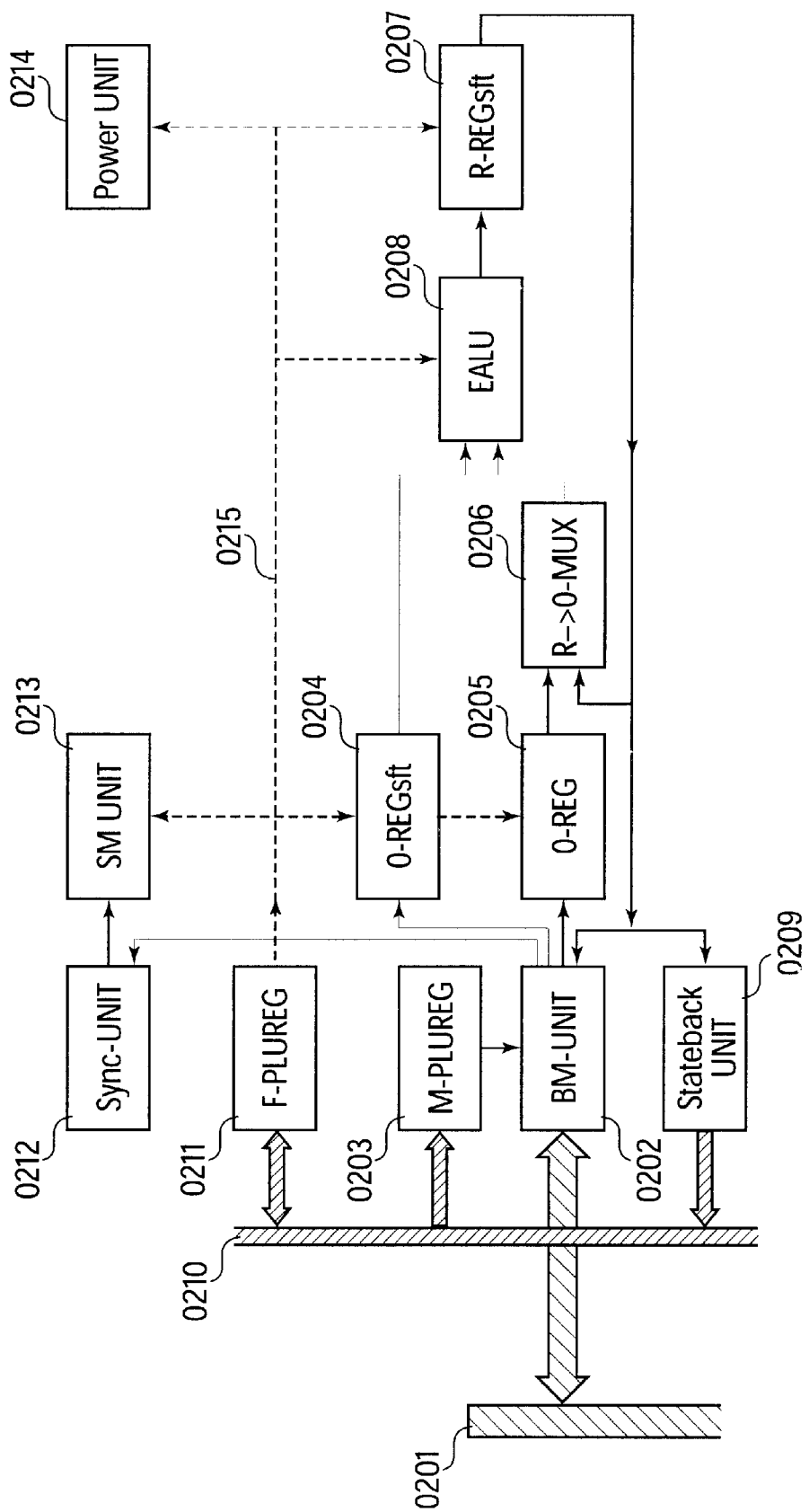
FIG. 2 illustrates an architecture of a PAE.

FIG. 2 shows the schematic architecture of a PAE. The internal bus system (0201) within the chip is connected to the BM UNIT (0202) which connects the buses selected by M-PLUREG (0203) to O-REGsft (0204) as operand 1 and O-REG (0205) as operand 2. The result available in result register R-REGsft (0207) is optionally introduced into the data path of operand 2 over R20-MUX (0206). The data from O-REGsft (0204) and R20-MUX (0206) are processed in the EALU (0208). Feedback goes to the PLU over the state-back UNIT (0209). The PLU bus (0210) is connected to the F-PLUREG (0211) and M-PLUREG (0212) registers and to the state-back UNIT (0209), and the PAE is configured and monitored over it. F-PLUREG contains all functional configuration data, and M-PLUREG contains the interconnection information of the PAE. The sync UNIT (0212) controls the interaction of the data exchange between the data transmitters, the data receivers, and the processing PAE. The SM UNIT (0213) controls the entire internal sequence of the PAE. The power UNIT (0214) regulates the power supply and serves to reduce power consumption.

Figure 3:
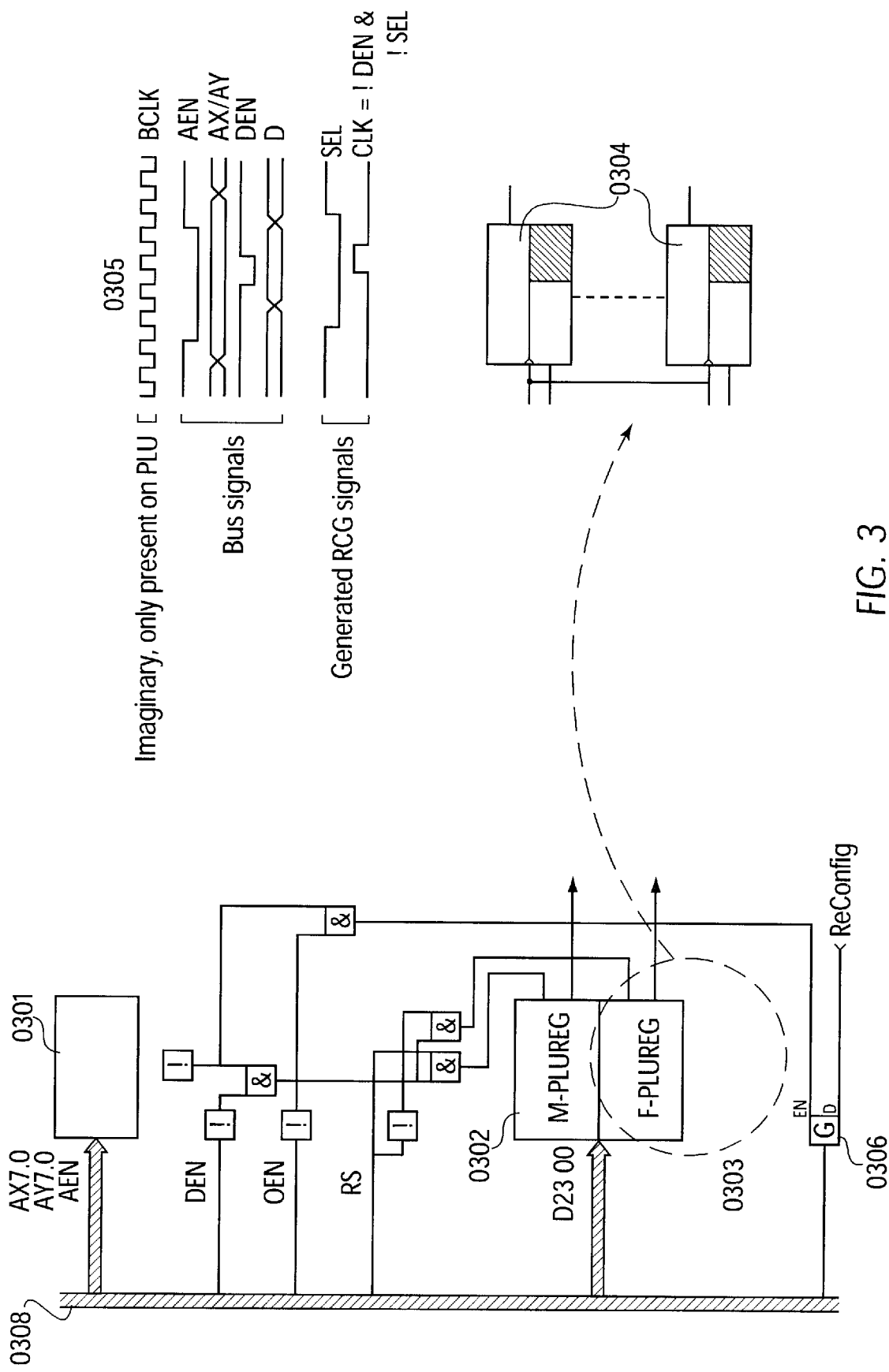
FIG. 3 illustrates an architecture of F-PLUREG and M-PLUREG.

FIG. 3 illustrates the functioning of the M-PLUREG and F-PLUREG registers. The AX and AY addresses of the PLU bus (0308) are compared with the address of PAE in a comparator (0301) if AEN (address enable) indicates a valid bus transfer. Each PAE has a unique address composed of its line and column within a PA (Processing array). If DEN (data enable) indicates data transmission, then either M-PLUREG (0302) or F-PLUREG (0303) is selected over RS (register select). The data are stored in the respective register at the rising edge of DEN. The registers are implemented as D flip-flops (0304). Timing diagram 0305 illustrates the sequence. The ReConfig signal is sent from the sync UNIT to the PLU bus only over the gate (0306) for read access to the F-PLUREG. Enable is based on the result of the comparator (0301) AND the OEN signal.

Figure 4A:
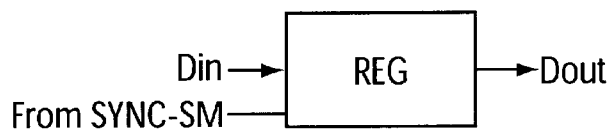
FIG. 4 illustrates an architecture of an O-REG.
Figure 4B:
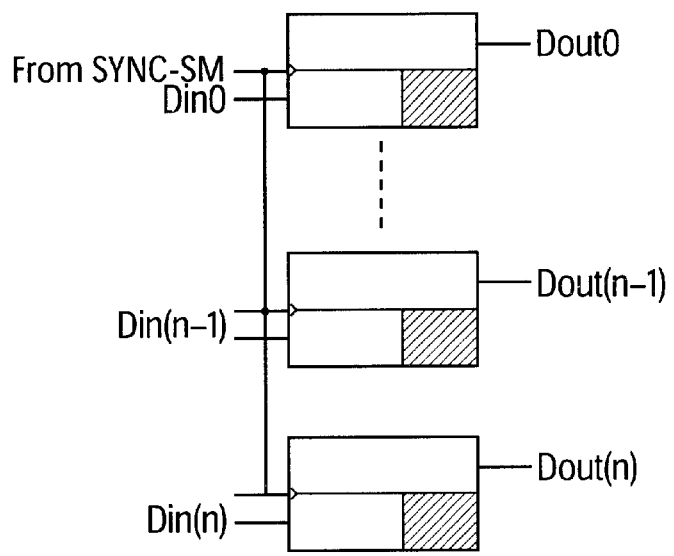
Figure 4C:
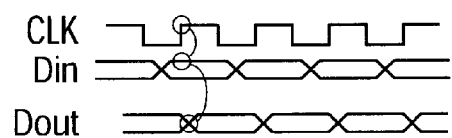

FIG. 4a shows a block diagram of O-REG. FIG. 4b shows how the O-REG is constructed of D flip-flops. FIG. 4c shows the timing diagram. The clock signal is generated by SYNC-SM.

Figure 5A:
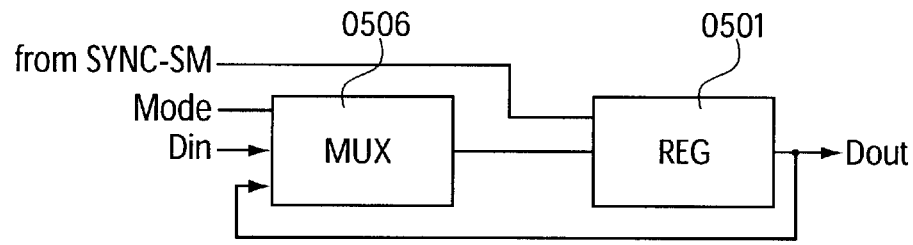
FIG. 5 illustrates an architecture of an O-REGsft provided with a right shift function.
Figure 5B:
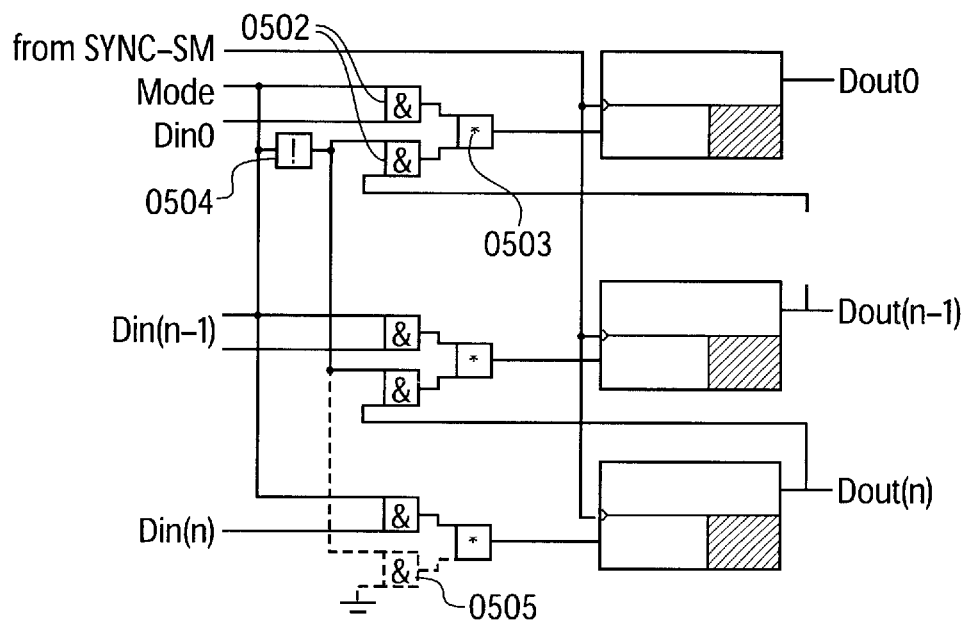
Figure 5C:
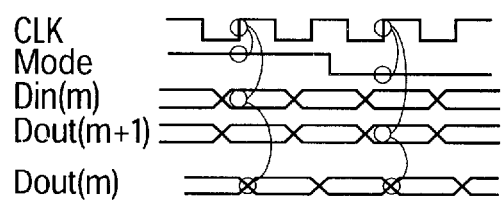

FIG. 5a shows a block diagram of O-REGsft. FIG. 5b shows how O-REGsft is constructed of D flip-flops (0501). The AND gates (0502) and OR gates (0503) form, via the inverter (0504), a mode-controlled multiplexer (0506) which either switches the input data to the D flip-flops (0501) or sends the output data of the D flip-flops, shifted by one bit, to their inputs. The AND gate (0505) is not necessary, because one input is permanently at logic 0. It is shown only for the purpose of illustration. FIG. 5c shows the timing diagram as a function of the signal mode. The clock pulse is generated by SYNC-SM.

FIG. 6a shows the block architecture of R-REGsft. Upstream from the register (0601) there is a multiplexer (0602) which either switches the input data to the register (0601) or directs the shifted output data of the register (0601) to its input. The clock pulse generated by SYNC-SM is sent to the register, shifted by one half clock pulse. FIG. 6b shows the block diagram on a gate level. Modes 0–2 switch a multiplexer (0606) consisting of AND gates with a downstream OR gate via a decoder (0603). Gates shown with dotted lines (0605, etc.) are shown only for the sake of illustration. They are functionless, because one input is constantly at L. The multiplexer switches the input signal to the registers (0607) in modes 0–2=010. In modes 0–2=000 to modes 0–2=001, the output values of the registers (0607) are shifted by one bit to the left, and in modes 0–2=011 to modes 0–2=100 they are shifted by two bits to the right and sent to the inputs of the registers. The timing diagram in FIG. 6c illustrates the shift function, depending on modes 0–2.

FIG. 7a shows the architecture of multiplexer R20-MUX which sends the operands or the result to EALU as a function of mode. FIG. 7a shows a traditional multiplexer design, while FIG. 7b shows the space-saving and power-saving variant due to the use of CMOS transfer gates (0701). All the multiplexers described in this document can be constructed with transfer gates.

A gate may be composed of transfer gates in a design equivalent to that of the multiplexer. However, the direction of data exchange is exactly the opposite.

Figure 8:
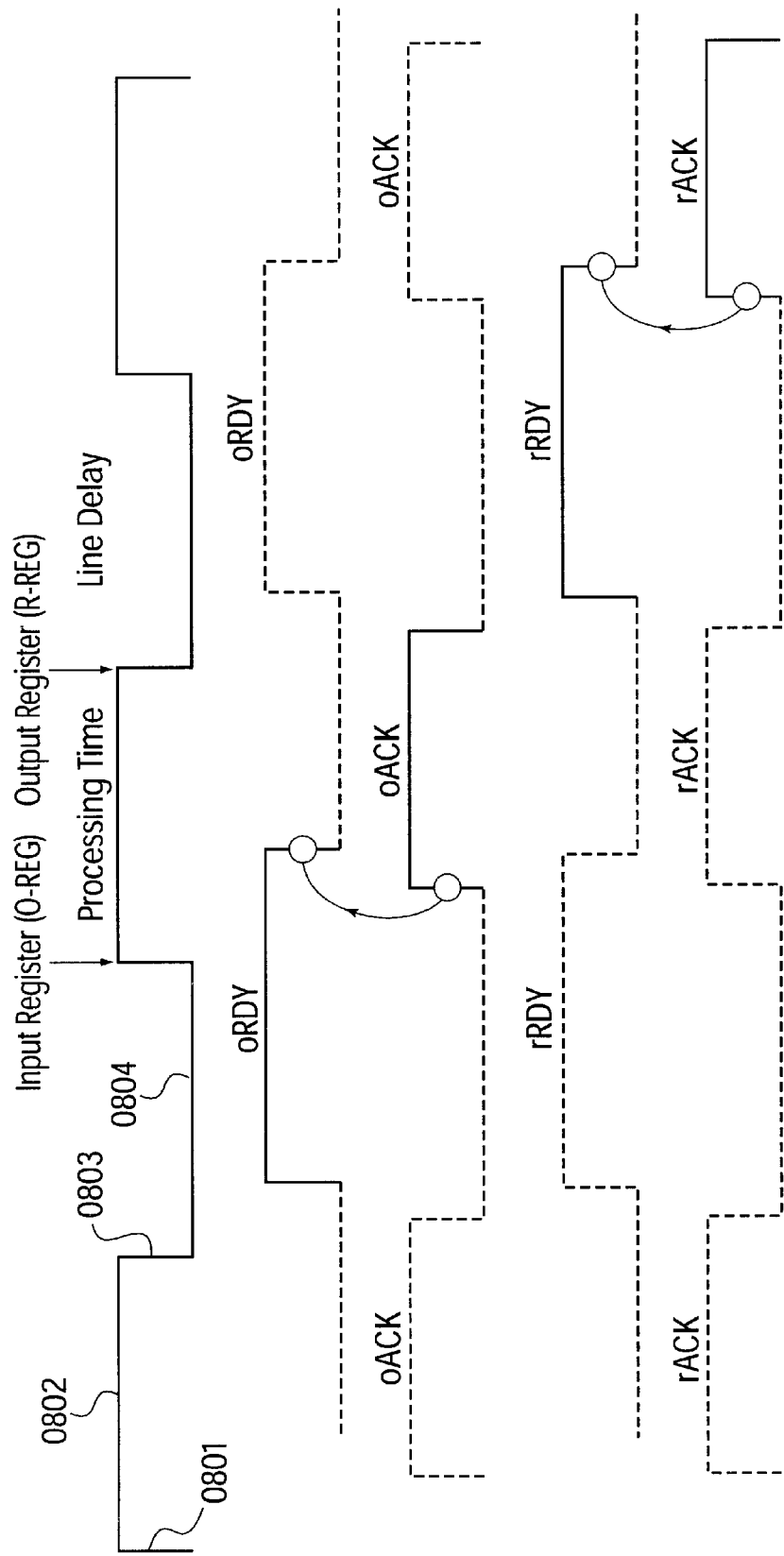
FIG. 8 shows a timing diagram of a clock synchronization, along with delays and sync signals.

FIG. 8 shows the relationship of PAE-internal clock CLK to the activities taking place. At the rising edge (0801), operands are stored in the O-REG. During the H level (0802), PAE processes the data (ΔPAE=processing phase). This includes the data traffic between O-REG and R-REG. At the trailing edge (0803) the result is stored in R-REG. The L level (0804) is used for distribution of the BM UNIT enclosed in the bus system (Δnetwork=bus phase). The time sequence of signals (oRDY and oACK, rRDY and rACK) generated by SYNC-SM is shown in the time diagram.

Figure 9:
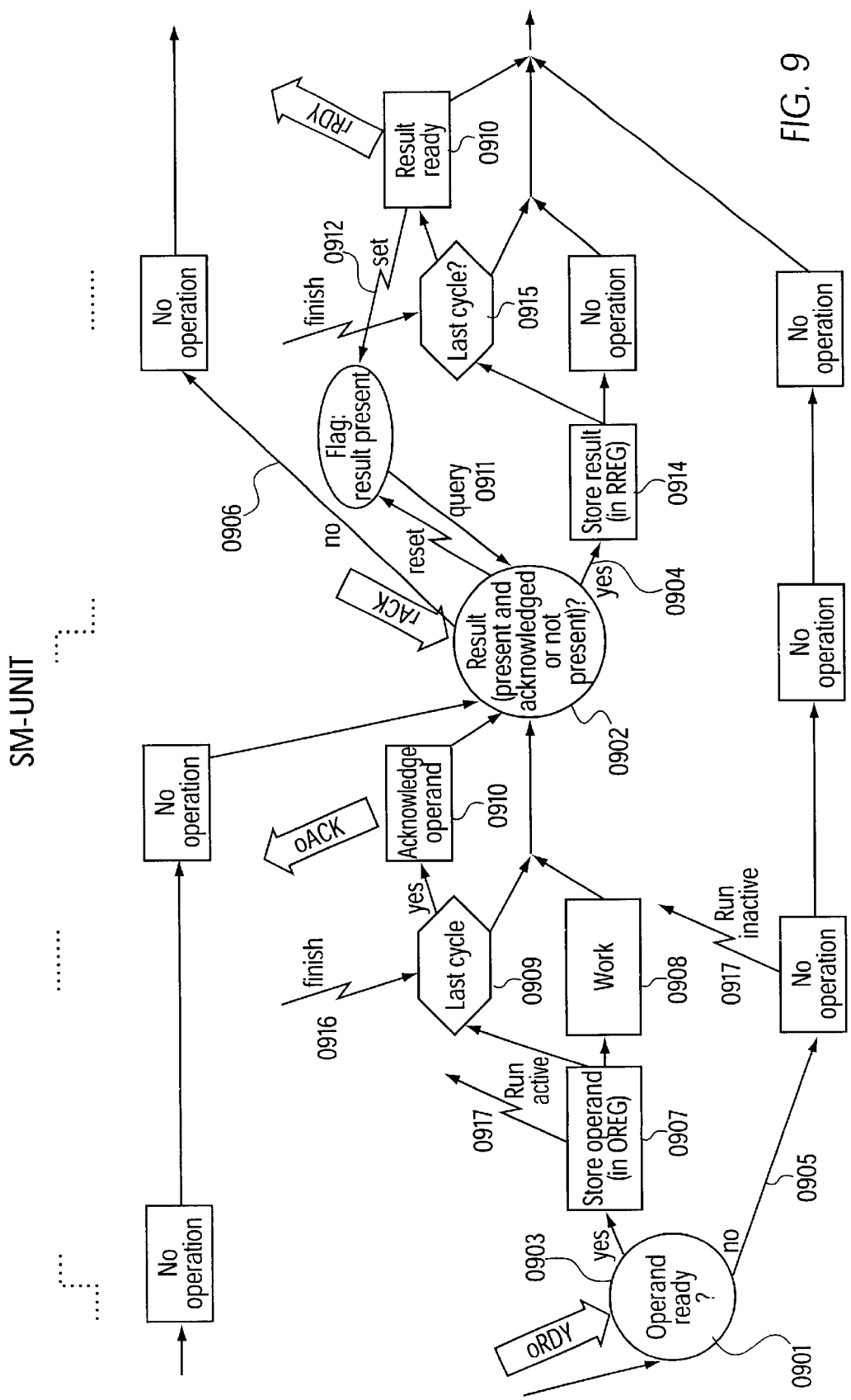
FIG. 9 illustrates a flow diagram showing a functioning of the sync UNIT.

FIG. 9 shows the sequence diagram of the sync UNIT. The state machine recognizes two fixed states, DATA (0901) and RESULT (0902). DATA is synchronized at the rising edge, and RESULT is synchronized at the trailing edge. The status of the input parameters is analyzed and, depending on the result, the machine jumps to the YES branch (0903/0904) or the NO branch (0905/0906). If the operands are not ready in DATA, the machine jumps to NO. No operation is carried out in the next steps until the machine jumps back according to DATA and performs an analysis again. If operands, indicated by oRDY, are ready, the operands are stored in O-REG (0907). The operands are processed (0908) and analyzed (0909) at the same time to ascertain whether it is the last cycle in multiple-cycle operations (serial operations requiring more than one clock cycle) or whether a single-cycle operation is taking place. In these cases, the operands are acknowledged by oACK (0910). RESULT is synchronized with the trailing edge, and a check is performed to determine whether the "result available" flag has been set (0911). This flag is always set when a finished result is signaled by rRDY (0912).

In two cases, the system jumps to the YES branch (0904):

There is no preceding result ("result available" flag is false), or

There is a preceding result ("result available" flag is true) and it is acknowledged with rACK. In this case (and only in this case(!)) 0902 resets the result (0913).

Otherwise the system jumps to the NO branch (0906) and no operation is carried out until the state machine returns after RESULT (0902). In the YES branch (0904), the result is stored in output register R-REGsft (0914). It is then determined whether this is the last cycle of a multiple-cycle operation (0915) (cf. 0909) or a single-cycle operation; if yes, the presence of the result is signaled by rRDY (0916). The state machine returns after DATA (0901). The recognition of whether it is the last cycle of an operation—or a single-cycle operation—can be queried of the SM UNIT via the FINISH signal (0916). This is active when the last—or single-cycle takes place. The status of the sync UNIT is signaled to the SM UNIT via RUN (0917). RUN is active in the event an operation is taking place; otherwise it is inactive. The mechanism of the STOP entry in F-PLUREG and the ReConfig generated from this are not shown in FIG. 9 because the sequence is trivial and is apparent from the description of the sync UNIT.

Figure 10:
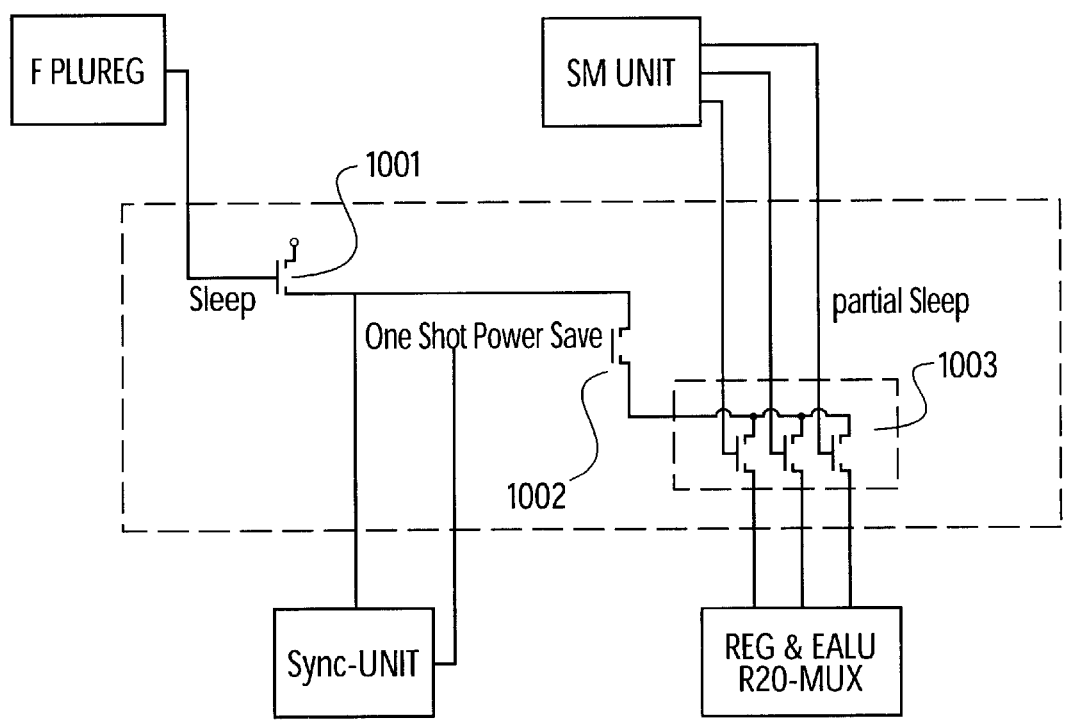
FIG. 10 illustrates an architecture of the power UNIT.

FIG. 10 shows the basic architecture of the power UNIT. The sleep signal is sent from F-PLUREG to a transistor or a transistor stage (1001), which controls the power supply for all cell functions that can be switched off. The sync UNIT delivers the one-shot power-save signal (see FIG. 16), which enables the power supply of the remaining cell functions via a transistor or transistor stage (1002). Depending on the functions actually used in the cell, the transistors or transistor stages (1003) shut down the unneeded functions (power down). It is understandable that other similar means such as capacitors, etc., must be provided for proper power supply and EMC behavior.

Figure 11:
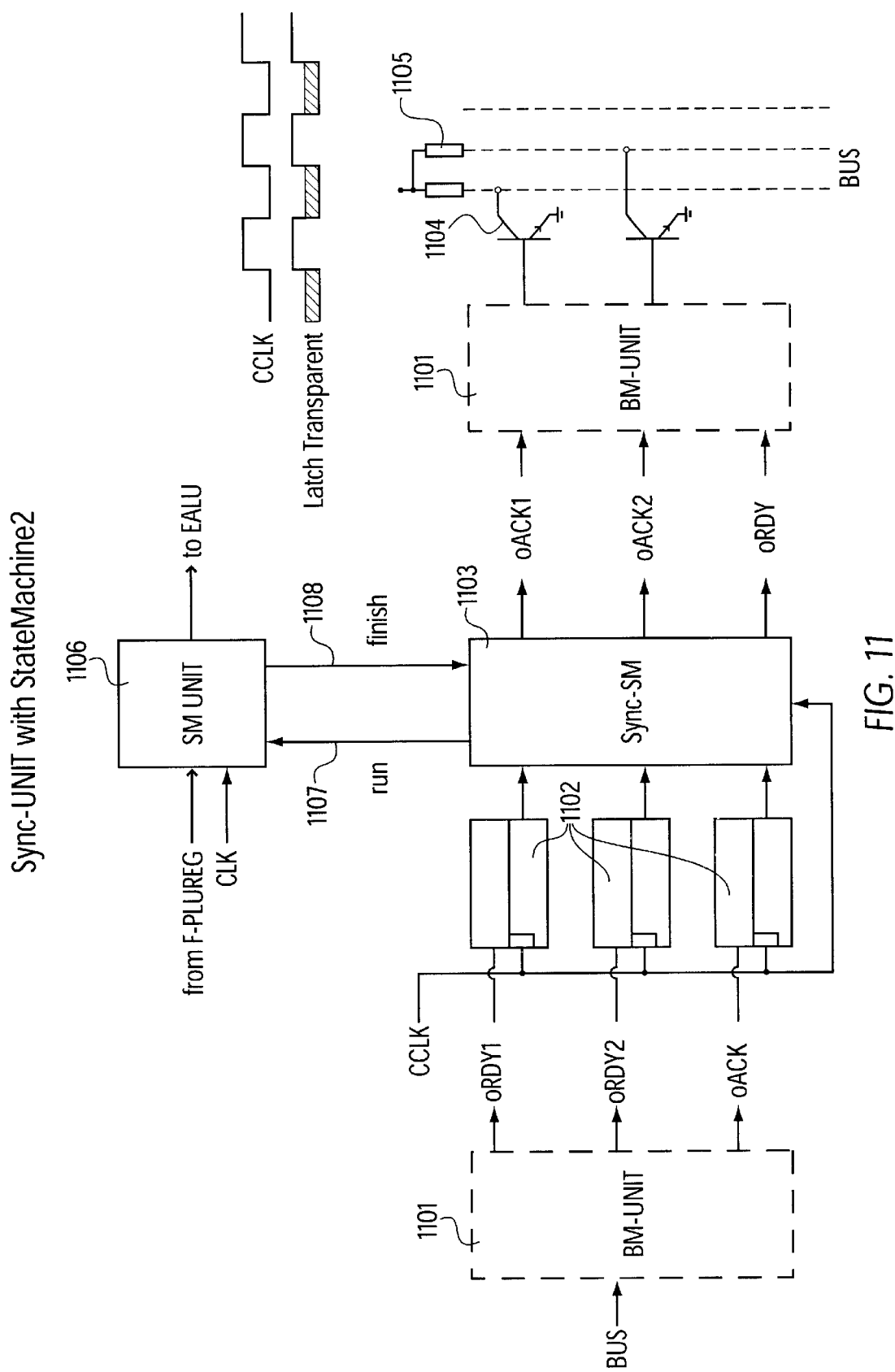
FIG. 11 illustrates an architecture of the sync UNIT.

FIG. 11 shows the implementation of the machine from FIG. 9 in the concept. The oRDY(½) and rACK signals are switched over the BM UNIT (1101) (in simplified terms—there is actually rACKh and RACKl, rACK=rACKl & rACKh) to the CCLK-controlled latches (1102). The latches are switched in such a way that they are transparent in the L phase (bus phase) of CCLK and hold their status in the H phase (processing phase). The outputs of the latches make available the signals for the sync state machine (1103). rRDY (in simplified terms: there are actually rRDYh and rRDYl—they are completely identical but are sent to different receivers) from 1103 is switched to the bus over a gate. The oACK(½) signals from 1103 are negated in the BM UNIT (1101) and sent to the inverting open collector bus driver (1104). The bus is pulled to H over resistors (1105). The BM UNIT is switched so that the following cases occur:

1. If the corresponding bus is not driven by the BM UNIT, L is at the base of the transistors (1104). Therefore, they place no load on the bus.
2. If the corresponding bus is driven by the BM UNIT and the signal is not acknowledged, the base of the transistors (1104) is at H. This means that the bus is pulled to L. If a result is distributed to multiple data receivers by broadcasting, then all PAEs that have not yet acknowledged the result data and need waiting cycles pull the bus to L.
3. If the corresponding bus is driven by the BM UNIT and the signal is acknowledged, the base of the transistors (1104) is at L. This means that the bus is not placed under load. If a result is distributed to multiple data receivers by broadcasting, all PAEs which have acknowledged the result data and do not need waiting cycles place no load on the bus.

In its initial state, the bus assumes the H level, i.e., acknowledgment, so non-acknowledgment according to case 2 overrides the acknowledgment by pulling the bus to L. The bus goes to the H level, i.e., the acknowledgment state, only when all PAEs acknowledge the result data. Thus, a wired-AND circuit is implemented. The sync state machine supplies the RUN signal (1107) to the SM UNIT (1106), which is running on the basis of RUN. If the SM UNIT is in the last—or only processing cycle—it signals this to the sync state machine via FINISH (1108). FINISH is analyzed in the analysis units to recognize the last cycle (0907, 0915). The SM UNIT runs in sync with the PAE-internal clock CLK.

Figure 12:
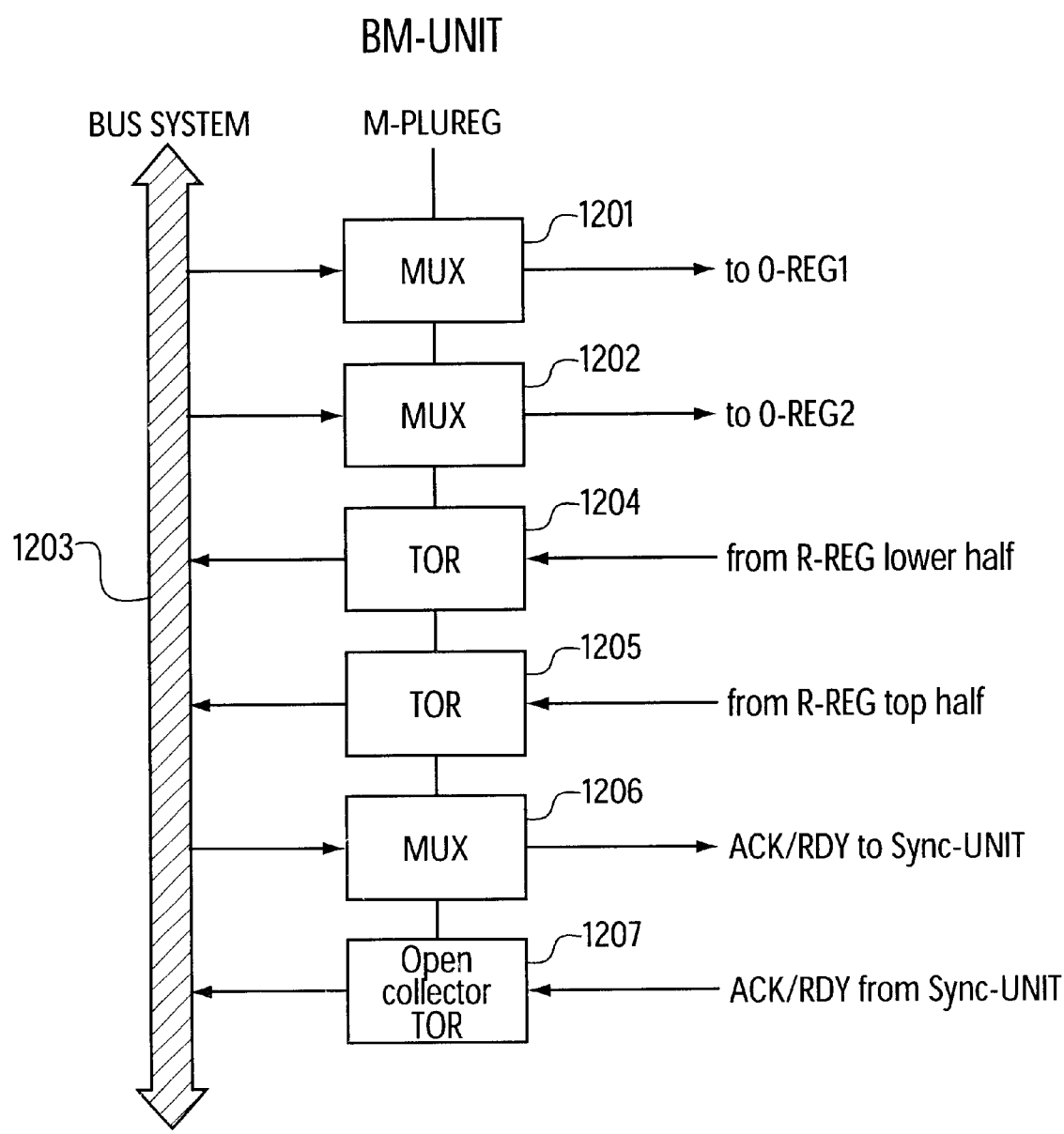
FIG. 12 illustrates an architecture of the BM UNIT.

FIG. 12 shows the architecture of the BM UNIT. Depending on the entries into M-PLUREG, the multiplexers (1201, 1202) switch the operands from the internal bus (1203) to O-REG. Likewise, the gates (1204, 1205) switch the upper and lower halves of the result to the bus. Multiplexer 1206 switches oRDY(½) according to the position of 1201 and 1202 and switches rACK according to the position of 1204 and 1205 from the bus to the PAE. The rACK signals of the two data receivers are linked together by AND. If there is only one data receiver, the multiplexer is switched so that it returns a logic 1 instead of the missing rACK. 1207 contains a gate for switching the oACK(½) and rRDY signals to the bus. The oACK(½) signals are first inverted and then switched to the bus over the open collector driver (1104).

Figure 13:
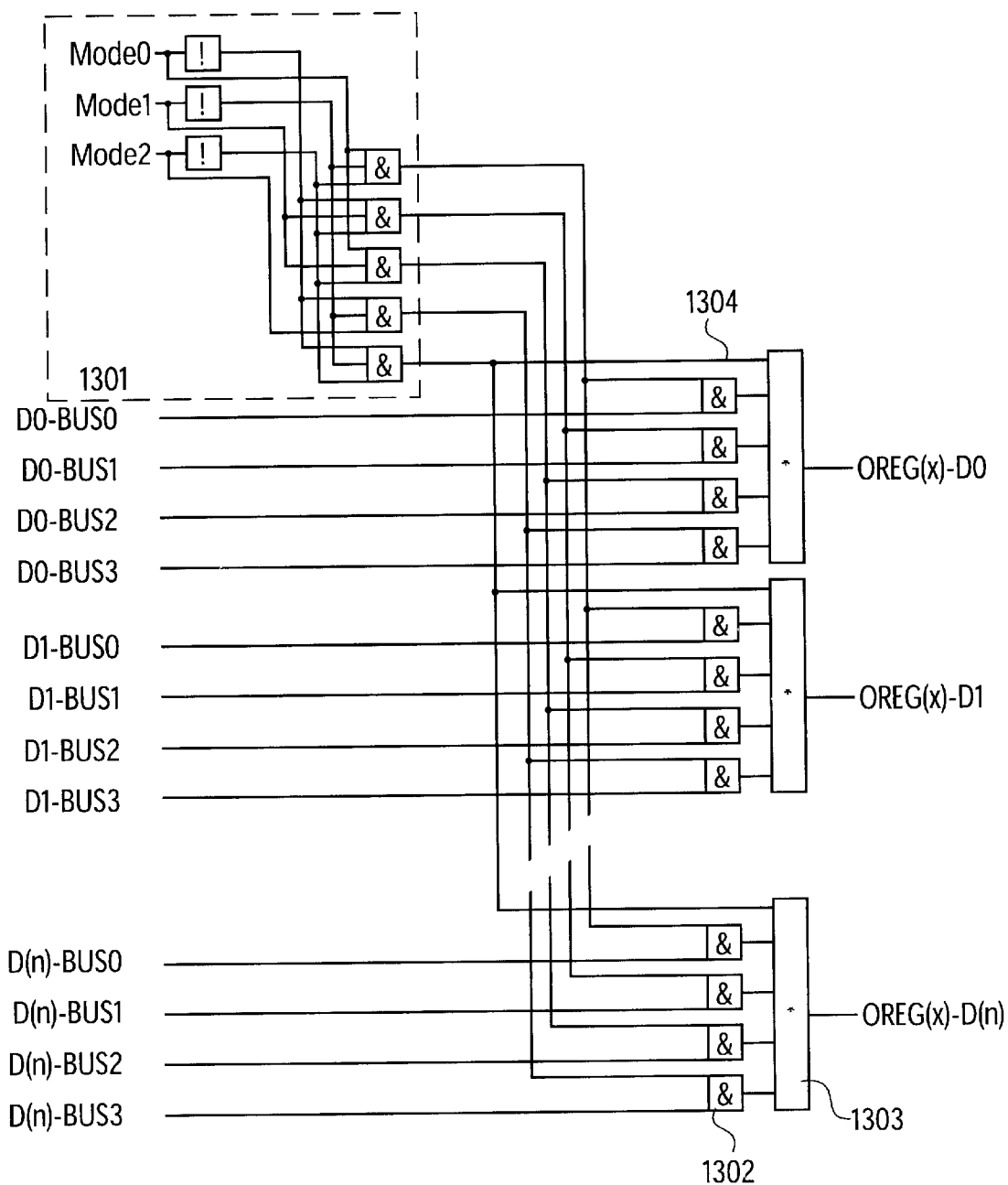
FIG. 13 illustrates an architecture of an O-MUX, limited to four bus systems.

FIG. 13 illustrates the architecture of an O-MUX. There is a 3:5 decoder (1301) for analyzing mode 2-0 signals from M-PLUREG. The multiplexer is constructed with AND gates (1302) and a downstream OR gate (1303). The analysis signal of mode 2-0=000 of the decoder (1301) is switched directly to the OR gate (1304). This causes logic 1 to always be returned in the open state, i.e., no connection to a bus system (see rACK in FIG. 12). Only a reduced bus size is shown for the sake of simplicity.

Figure 14:
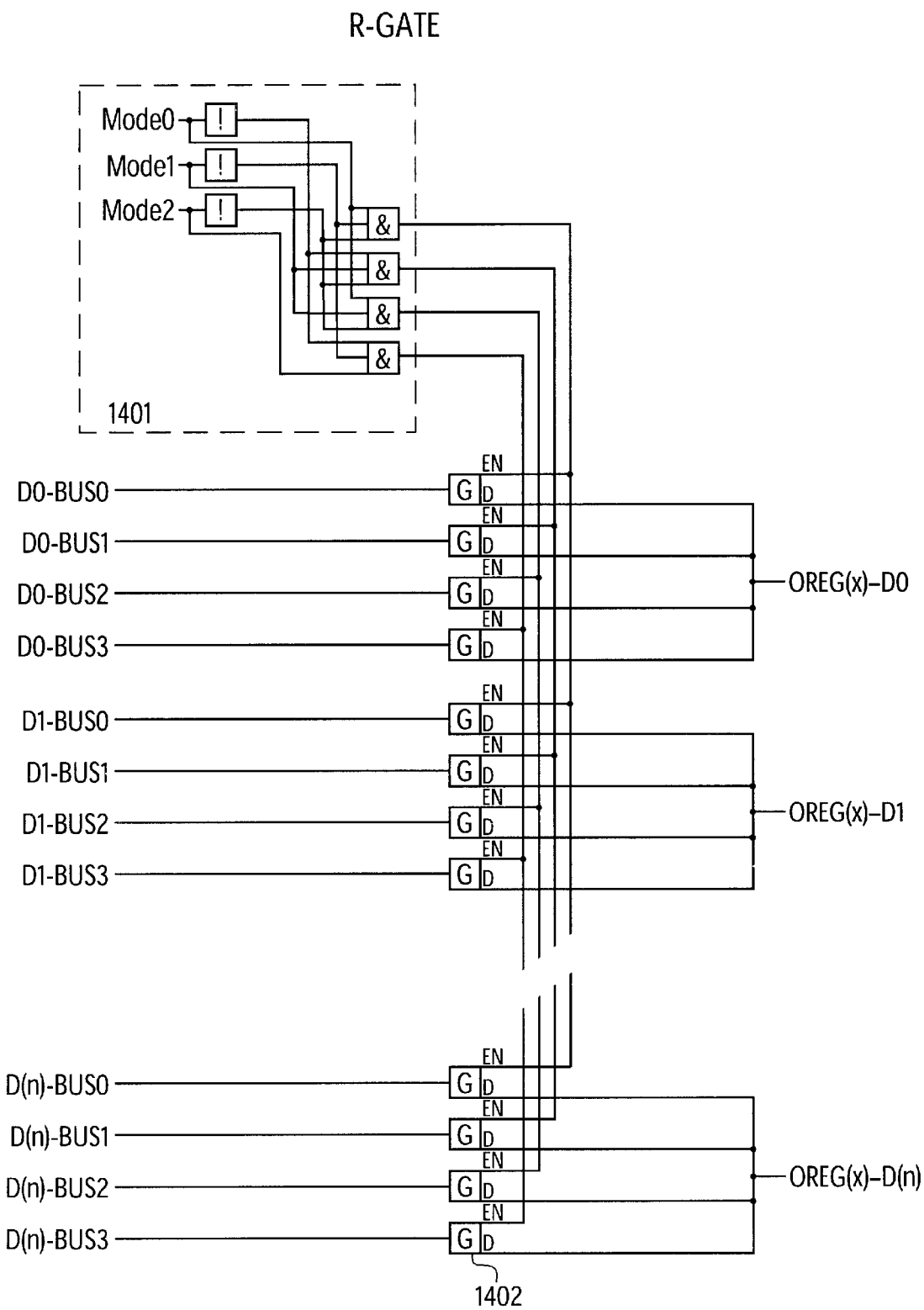
FIG. 14 illustrates an architecture of an R GATE, limited to four bus systems.

FIG. 14 shows the architecture of an R GATE. There is a 3:4 decoder (1401) for analyzing mode 2-0 signals from M-PLUREG. The analysis signal of mode 2-0=000 of the decoder is not used. Therefore, no bus connection is established with this bit combination. The gates (1402) are composed either of AND gates or transmission gates (see 0701). An amplifier stage for driving the bus load is connected upstream or downstream. Only a reduced bus size is shown for the sake of simplicity.

Figure 15:
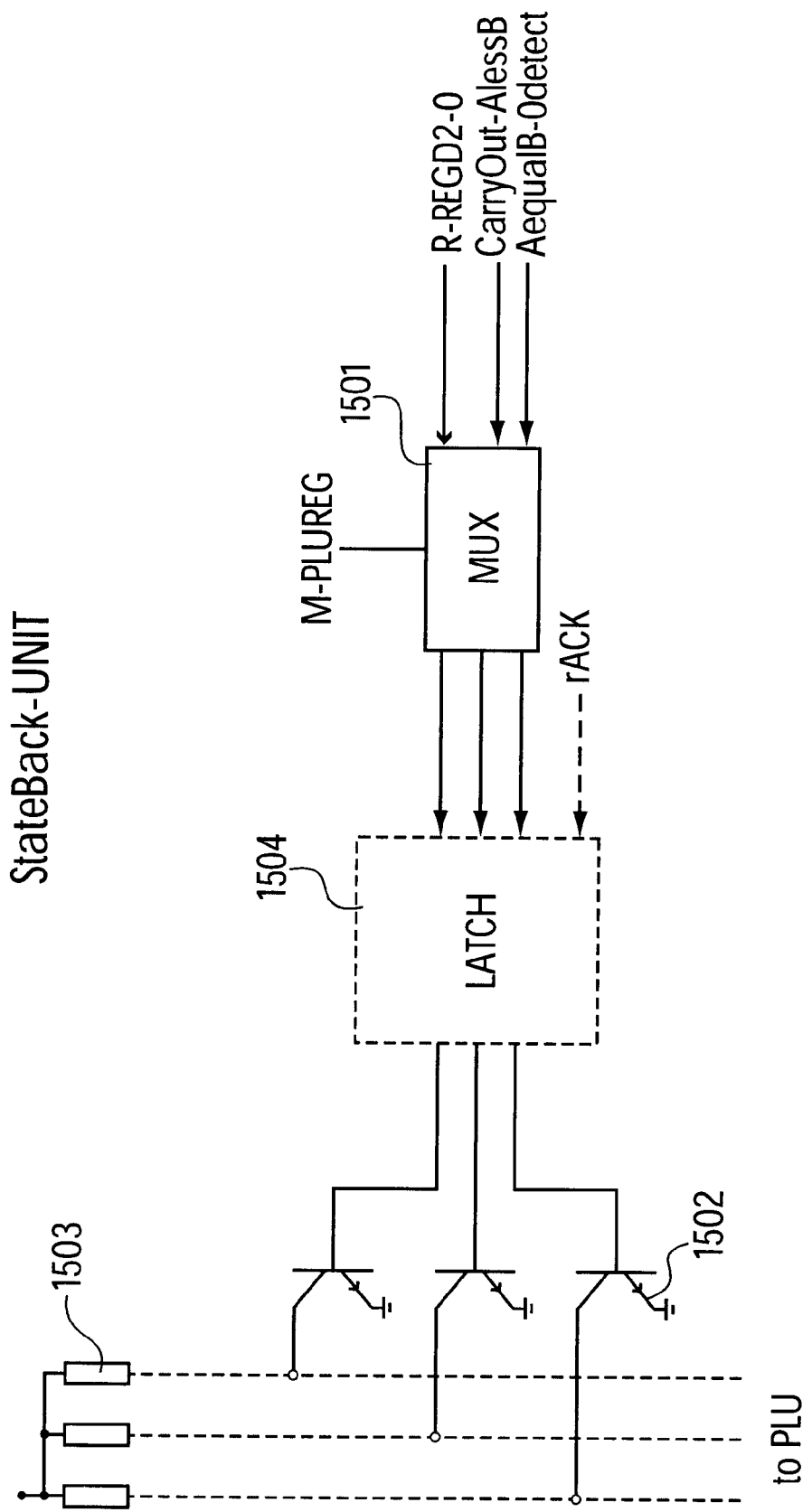
FIG. 15 illustrates an architecture of the state-back UNIT.

FIG. 15 shows the state-back UNIT. Depending on the setting in M-PLUREG, a multiplexer (1501) switches through either the signals CarryOut-AlessB, AequalB-0detect from the EALU, or the outputs of R-REG R-REGD2-0. The signals go to an open collector transistor stage (1502) and are switched to the PLU bus. The PLU bus needs external pull-up resistors (1503) positioned near the PLU. Latch 1504 is optional. If it is inserted into the output signals of 1501, they are switched to the bus (1503) only after the data receiver has acknowledged the data via rACK. Consequently, the readiness for reconfiguration is indicated by the status signals only when the data have been accepted. This is normally regulated by the interaction of STOP and ReConfig in the sync UNIT. Therefore, the latch is optional. The rACK signal is used as the latch clock pulse. The latch is transparent at rACK=1 and saved at rACK=0.

Figure 16:
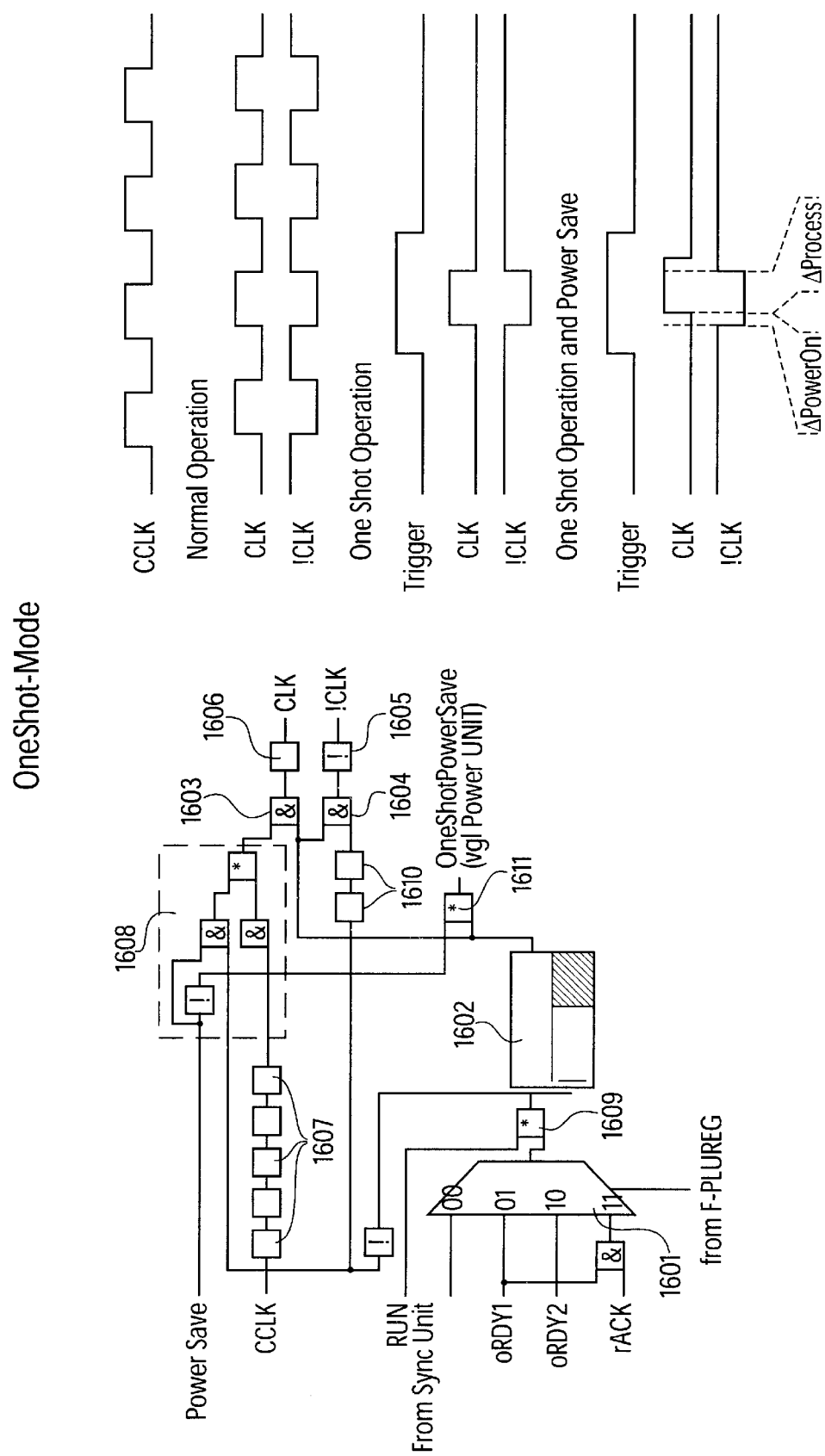
FIG. 16 illustrates a timing diagram showing an operating principle of the one-shot MODE and the one-shot/power-save MODE.

FIG. 16 illustrates the operation of the one-shot MODE. The signals

Vcc
oRDY1
oRDY2
(oRDY1 & rACK)

enable the cell clock via a multiplexer (1601) depending on the setting in F-PLUREG. The effect of the enable via Vcc is that the clock is always running (see "normal operation" in the timing diagram). In the three remaining modes, the clock does not run until the signals or signal combinations enable the clock. The enable is synchronized to clock CCLK, by a latch (1602), so the phase is not aborted prematurely when the enable signal is too short. The latch is transparent in the L phase of CCLK and holds its value in the H phase. The enable signal goes to the AND gate pair (1603 and 1604) which enables the clock. Inverted clock signal !CLK is generated by an inverter (1605); CLK runs through a time-delay element (1606) to guarantee phase coincidence (see "one-shot operation" in the timing diagram). CCLK is delayed over two delay pulses (1610) in the incoming line to 1604 to guarantee phase coincidence with CCLK which is applied to 1603 and has been delayed by the multiplexer (1608). If a PAE is brought into the power-save mode, the power supply of the cell is mostly shut down. This is done via OR gate 1611. If the power-save MODE has been activated, i.e., power save=1, the negated signal carries an L level. If one-shot MODE has also been switched on and register 1602 is at L, the power supply transistor in the power UNIT (see FIG. 17) is also switched off via the one-shot power-save signal. However, if register 1602 is at logic 1 (or power save=0), the power supply transistor is switched on via 1611. The following table gives an overview of the function:

| Power save | Latch (1602) | Voltage | Comments |
|---|---|---|---|
| L | X | on | |
| H | L | off | only when one-shot MODE has been set! |
| H | H | on | |

When switching on the power supply, there is a wake-up time of fixed duration until the cell is capable of functioning. To nevertheless function properly, the signals must be delayed accordingly. Therefore, CCLK is sent over a delay line (1607). A multiplexer (1608) selects according to the power-save signal from F-PLUREG whether the normal or delayed clock pulse is sent to the cell. Only the uninverted clock pulse is delayed by the Δpower-on period; the inverted clock pulse is not delayed. Therefore, the result is available in synchronization with the remaining functions of the unit. Thus, the usable processing time is reduced to Δprocess. The maximum clock frequency of the unit thus depends on Σ=Δpower-on+Δprocess (see "one-shot operation with power save" in the timing diagram).

5. Definition of Terms

AequalB-0detect: Signal generated by the EALU, indicating in arithmetic operations that the result is equal to zero. In comparisons, it indicates that operand A is equal to operand B.

ALU: Arithmetic and logic unit. Basic unit for processing data. The unit can perform arithmetic operations such as addition, subtraction, or, under some circumstances, multiplication, division, series expansions, etc. The unit may be designed as an integer unit or as a floating point unit. It may also perform logic operations such as AND, OR, and comparisons.

BM UNIT: Unit for connecting the data to the bus systems outside the PAE. The connection takes place via multiplexers for the data inputs and gates for the data outputs. oACK lines are implemented as open collector drivers. The BM UNIT is controlled by M-PLUREG.

Broadcast: Transmitting data from a PAE to multiple data receivers.

CarryOut-AlessB: Signal generated by the EALU which indicates a carry-over in arithmetic operations. In comparisons, it indicates that operand A is smaller than operand B.

Data receiver: The unit(s) which processes further the results of the PAE.

Data transmitter: The unit(s) which makes available the data for the PAE as operands.

D flip-flop: Storage element that stores a signal at the rising edge of a clock pulse.

EALU: Expanded arithmetic and logic unit. An ALU expanded to add special functions that are needed or appropriate for the operation of a data processing system according to DE 44 16 881 A1. These are counters in particular.

FPGA: Known field-programmable gate array.

F-PLUREG: Register in which the function of the PAE is set. The one-shot and sleep modes are also set here. The PLU writes into the register.

Gate: Group of transistors that perform a basic logic function. Basic functions include, for example, NAND, NOR. Transmission gates.

H level: Logic 1 level, depending on the technology used.

Handshake: Signal protocol in which one signal A indicates a state and another signal B confirms that it accepts signal A and responds (has responded) to it.

Configuring: Determining the function and interconnecting a logic unit, a (FPGA) cell or a PAE (see reconfiguring).

Latch: Storage element which normally relays a signal transparently during the H level and stores it during the L level. Latches where the function of the levels is exactly reversed are occasionally used in PAEs, in which case an inverter is connected upstream from the clock of a conventional latch.

L level: Logic 0 level, depending on the technology used.

M-PLUREG: Register in which the interconnection of the PAE is set. The PLU writes into the register.

Next-neighbor interconnection: Interconnection of bus systems with the adjacent neighbors abutting at the edges.

O-MUX: Multiplexer within the BM UNIT which selects the bus system of the operands.

One shot: Mode in which a PAE operates at a lower clock rate than the processor clock rate. The clock rate is synchronous with the processor clock rate and corresponds to one period. There is no phase shift. The clock pulse is enabled by one of the signals oRDY (½) or rRDY. This mode serves to save power when the data transmitters or receivers are transmitting or receiving data at a slower rate than the processor clock rate.

Open collector: Circuitry in which a bus signal pulled to the H level via a pull-up is applied to the collector of a transistor. The emitter of the transistor is grounded. If the transistor switches, the bus signal is pulled to the L level. The advantage of this method is that a plurality of such transistors can control the bus without electrical collision. The signals are OR linked, resulting in wired-OR.

O-REG: Operand register for storing the operands of the EALU. It makes it possible for the PAE to be independent of the data transmitters in time and function. This simplifies data transfer because it can be asynchronous or packet-oriented. At the same time, the possibility of reconfiguring the data transmitters independently of the PAEs or reconfiguring the PAEs independently of the data transmitters is created.

O-REGsft: O-REG with a shift register controlled by the SM UNIT.

PA: Processing array: array of PAEs.

PAE: Processing array element: EALU with O-REG, R-REG, R20-MUX, F-PLUREG, M-PLUREG, BM UNIT, SM UNIT, sync UNIT, state-back UNIT and power UNIT.

PLU: Unit for configuring and reconfiguring the PAW. Embodied by a microcontroller adapted specifically to its task.

Power-save MODE: Power-saving mode within the one-shot MODE.

None of the parts of the PAE except the F-PLUREG, M-PLUREG and sync unit are supplied with voltage when no operation is being carried out.

Power Unit: Unit which regulates the power-saving functions.

Pull-down: Resistor which pulls a bus line to an L level.

Pull-up: Resistor which pulls a bus line to an H level.

R GATE: Switch within the BM UNIT which switches the result to the corresponding bus system. Some signals are switched over open collector drivers. The R GATE works as a bus driver and can enter a bus-neutral mode.

R20-MUX: Multiplexer for inserting the result in an R-REGsft into the data path between O-REG and EALU.

R-REGsft: Result register for storing the result of the EALU. It makes it possible for the PAE to be independent, in time and function, of the data receivers. This simplifies data transfer because it can be asynchronous or packet-oriented. At the same time, this creates the possibility of reconfiguring the data receivers independently of the PAE or reconfiguring the PAE independently of the data receivers. The register is provided with a shift function which is controlled by the SM UNIT.

Serial operations: Operations performed by serial processing of a data word or an algorithm. Serial multiplication, serial division, series expansion.

Sleep MODE: Power-saving mode in which the PAE, except for F-PLUREG, carries no voltage.

SM UNIT: State machine UNIT. State machine which controls the EALU.

State-back UNIT: Unit which controls the feedback of the status signals to the PLU. Consists of a multiplexer and an open collector bus driver stage.

Sync UNIT: Unit responsible for the synchronization of the PAE with the data transmitters and receivers, which also monitors the reconfiguration of PAEs. At the same time, it assumes the one-shot functions.

Gate: Switch that forwards or blocks a signal. Simple comparison: relay.

Reconfiguring: New configuration of any number of PAEs while any remaining PAEs continue with the same function (see configuring).

State machine: Logic which can assume various states. The transitions between the states depend on various input parameters. These are known machines that are used to control complex functions.

6. Conventions 6.1.Naming Conventions

Assembly group: UNIT
Operating mode: MODE
Multiplexer: MUX
Negated signal: not
Visible register for PLU: PLUREG
Internal register: REG
Shift registers: sft 6.2Function Convention Shift registers: sft
AND function: &

| A | B | Q |
|---|---|---|
| 0 | 0 | 0 |
| 0 | 1 | 0 |
| 1 | 0 | 0 |
| 1 | 1 | 1 |

OR function: #

| A | B | Q |
|---|---|---|
| 0 | 0 | 0 |
| 0 | 1 | 1 |
| 1 | 0 | 1 |
| 1 | 1 | 1 |

NOT function: !

| A | Q |
|---|---|
| 0 | 1 |
| 1 | 0 |

GATE function: G

| EN | D | Q |
|----|---|---|
| 0  | 0 | — |
| 0  | 1 | — |
| 1  | 0 | 0 |
| 1  | 1 | 1 |

What is claimed is:

1. A configurable unit for processing numerical and logic operations, the configurable unit being controlled by a program load unit, comprising:
a programmable arithmetic and logic unit for performing mathematical and logical functions;
a respective synchronization unit in communication with the programmable arithmetic and logic unit for synchronizing the configurable unit with a plurality of other configurable units, the configurable unit and the plurality of other configurable units arranged in a multi-dimensional pattern, the synchronization unit for receiving handshake signals from at least one of the plurality of other configurable units, at least one of the other configurable units being a non-next-neighbor of the configurable unit in the multi-dimensional pattern, and for transmitting handshake signals to at least one of the plurality of other configurable units; and
a state unit in communication with the programmable arithmetic and logic unit, the state unit for providing state information to the program load unit.

2. The configurable unit according to claim 1, further comprising:
a first register, the synchronization unit being in communication with the programmable arithmetic and logic unit via the first register.

3. The configurable unit according to claim 1, wherein the state information includes reconfigurability information.

4. The configurable unit according to claim 1, wherein each of the plurality of configurable units include a respective synchronization unit.

5. The configurable unit of claim 1, wherein
the synchronization unit is configured to receive and transmit handshake signals to a second of the plurality of other configurable units, the second of plurality of other configurable units being a next-neighbor of the configurable unit in the multi-dimensional pattern.

6. A configurable data processor, comprising:
a plurality of configurable units for processing numerical and logic operations, the plurality of configurable units arranged in a multi-dimensional pattern, each of the plurality of configurable units capable of operating as at least one of a data receiver and a data transmitter, each of the plurality of configurable units including
a programmable arithmetic and logic unit for performing mathematical and logical functions, and
a synchronization unit in communication with the programmable arithmetic and logic unit for synchronizing the configurable unit with at least another of the plurality of configurable units, the synchronization unit for receiving handshake signals from at least one of the plurality of other configurable units, at least one of the other configurable units being a non-next-neighbor of the configurable unit in the multidimensional pattern, and for transmitting handshake signals to at least one of the plurality of other configurable units, and a state unit in communication with the programmable arithmetic and logic unit, the state unit for providing state information to a program load unit, the program load unit controlling a reconfiguration of the configurable unit;

wherein when one of the plurality of configurable units operates as the data receiver, it acknowledges data received by transmitting a data received signal to another one of the plurality of configurable units operating as the data transmitter.

7. The configurable unit according to claim 6, wherein the another one of the plurality of configurable units transmits a readiness signal indicating whether or not the another one of the plurality of configurable units is ready to transmit data.

8. The configurable data processor of claim 6, wherein the synchronization unit is configured to receive and transmit handshake signals to a second of the plurality of other configurable units, the second of the plurality of other configurable units being a next-neighbor of the configurable unit in the multi-dimensional pattern.

9. A configurable unit for processing numerical and logic operations, the configurable unit being controlled by a program load unit, the configurable unit comprising:

a programmable arithmetic and logic unit for performing a plurality of basic mathematical and logic functions;

a first plurality of registers in communication with the programmable arithmetic and logic unit for storing data relating to a function of the configurable unit and data relating to an interconnection of units within the configurable unit;

a first state machine for controlling the programmable arithmetic and logic unit;

at least one register, in communication with at least the programmable arithmetic and logic unit, for storing at least one operand of the programmable arithmetic and logic unit, at least one of the at least one register including a shift register and at least one of the at least one register being a result register, the result register storing result data;

a multiplexer having an input coupled at least to an output of the result register and an output coupled an input of the programmable arithmetic and logic unit, the multiplexer providing the result data to the input of the programmable arithmetic and logic unit;

a bus unit, in communication with the result register, for providing a pick-up of data from a bus system and for providing the result data to the bus system, the bus unit being capable of sending data to a plurality of receiving units and automatically synchronizing the plurality of receiving units;

a second state machine, in communication with at least the first state machine, for automatically controlling a sequence of bus transfers occurring over the bus system and including a plurality of handshake lines; and a state-back unit, in communication with the result register, for providing to the program load unit a processing status and a reconfigurability status of the configurable unit, wherein any one of a configuration and a reconfiguration of the configurable unit has no interfering effect on any other configurable unit that is in communication with the program load unit.

10. The configurable unit according to claim 9, further comprising means for stopping a data processing operation of the configurable unit and means for providing to the bus system a signal indicating that the configurable unit is ready for reconfiguration when a current data processing operation is completed.

11. The configurable unit according to claim 9, further comprising a power unit, in communication with at least the register for storing the result data, wherein the power unit includes:

means for providing a first power-saving mode, wherein during the first power-saving mode the configurable unit always operates only when operands from a data transmitter are ready at an input of the configurable unit and when result data have already been accepted by one of the plurality of receivers, and wherein the configurable unit otherwise remains inactive without a clock pulse;

means for providing a second power-saving mode, wherein during the second power-saving mode those components of the configurable unit that are irrelevant for the execution of a current data processing operation are separated from at least one of a clock pulse supply and a power supply; and means for providing a third power-saving mode, wherein during the third power-saving mode the configurable unit is separated from the power supply.

12. A method of synchronizing data flow in a data flow processor, the data flow processor including processing array elements arranged in a multi-dimensional pattern, comprising the steps of:

transmitting a ready signal by a first element of the processing array elements;

receiving the ready signal by a second element of the processing array elements, the second element of the processing array elements being a non-next-neighbor of the first element of the processing array elements;

after receiving the ready signal, transmitting an acknowledgment signal from the second element to the first element only if the second element is in a first state, the first state being a state in which the second element is capable of accepting data;

entering a wait state by the first element if the acknowledgment signal is not received within one clock cycle; and processing by the first element a next data after the first acknowledgment signal is received.

13. The method of claim 12, further comprising the steps of:

processing first data by the second element; and entering the wait state if the second element completes processing the first data and does not received the ready signal.

14. The method of claim 12, further comprising the steps of:

transmitting second data from the first element to the second element after the first element receives the transmitted acknowledgement signal from the second element.

15. The method of claim 12, further comprising:

transmitting a second ready signal by the first element of the processing array elements;

receiving the ready signal by a third element of the processing array elements, the third element of the processing array elements being a next-neighbor of the first element of the processing array elements;

after receiving the second ready signal, transmitting a second acknowledgment signal from the third element to the first element only if the third element is in a second state, the second state being a state in which the third element is capable of accepting data;

entering a wait state by the first element if the second acknowledgment signal is not received within one clock cycle; and processing by the first element a second next data after the second acknowledgment signal is received.

16. A configurable unit for processing numerical and logic operations, the configurable unit being controlled by a program load unit, comprising:

a programmable arithmetic and logic unit arranged to perform mathematical and logical functions;

a respective synchronization unit in communication with the programmable arithmetic and logic unit and arranged to synchronize the configurable unit with a plurality of other configurable units, the synchronization unit arranged to receive handshake signals from at least one of the plurality of other configurable units via an external bus, and arranged to transmit handshake signals to at least one of the plurality of other configurable units via the external bus, the external bus arranged to link the configurable unit with at least two of the plurality of other configurable units;

a state unit in communication with the programmable arithmetic and logic unit, the state unit for providing state information to the program load unit.

17. The configurable unit of claim 16, further comprising:

a bus unit in communication with the programmable arithmetic logic unit and the external bus.

18. The configurable unit of claim 17, wherein the bus unit is arranged to disconnect the configurable unit from the external bus when the configurable unit is not configured.

19. The configurable unit of claim 17, wherein the bus unit is arranged to suppress the transmission of handshake signals when the configurable unit is not configured.

20. A configurable data processor, comprising:

a plurality of configurable units arranged to process numerical and logic operations, each of the plurality of configurable units capable of operating as at least one of a data receiver and a data transmitter;

a plurality of buses, each bus arranged to connect at least three of the plurality of configurable units;

wherein each of the plurality of configurable units includes a programmable arithmetic and logic unit arranged to perform mathematical and logical functions, and a synchronization unit in communication with the programmable arithmetic and logic unit and arranged to synchronize the configurable unit with at least another of the plurality of configurable units, the synchronization unit arranged to receive handshake signals from at least one of the plurality of other configurable units via at least one of the plurality of buses, and arranged to transmit handshake signals to at least one of the plurality of other configurable units via the at least one of the plurality of buses, and a state unit in communication with the programmable arithmetic and logic unit, the state unit for providing state information to a program load unit, the program load unit controlling a reconfiguration of the configurable unit, and wherein when one of the plurality of configurable units operates as the data receiver, it acknowledges data received by transmitting a data received signal via one of the plurality of buses to another one of the plurality of configurable units operating as the data transmitter.

21. The configurable data processor of claim 20, wherein each of the plurality of configurable units further comprises a respective bus unit, the respective bus unit in communication with the programmable arithmetic logic unit and at least one of the plurality of buses, the bus unit arranged to suppress the transmission of handshake signals by the configurable unit when the configurable unit is not configured.

22. A method of synchronizing data flow in a data flow processor, the data flow processor including processing array elements arranged in a multi-dimensional pattern and a plurality of external buses, each bus arranged to link at least three of the processing array elements, comprising the steps of:

transmitting a ready signal by a first element of the processing array elements via one of the plurality of external buses;

receiving the ready signal by a second element of the processing array elements;

after receiving the ready signal, transmitting an acknowledgment signal from the second element to the first element via the external bus only if the second element is in a first state, the first state being a state in which the second element is capable of accepting data;

entering a wait state by the first element if the acknowledgment signal is not received within one clock cycle; and processing by the first element a next data after the first acknowledgment signal is received.

23. The method of claim 22, further comprising:

suppressing the transmission of ready signals by the first element when the first element is not configured.

24. The method of claim 22, further comprising:

suppressing the transmission of the acknowledgment signal from the second element when the second element is not configured.

25. The method of claim 22, further comprising:

receiving the ready signal by a third element of the processing array elements.

* * * * *

UNITED STATES PATENT AND TRADEMARK OFFICE
CERTIFICATE OF CORRECTION

PATENT NO.   : 6,425,068 B1
DATED        : July 23, 2002
INVENTOR(S)  : Vorbach et al.

It is certified that error appears in the above-identified patent and that said Letters Patent is hereby corrected as shown below:

<u>Title page, Item [54] and Column 1, line 5,</u>
Change "DSPS" to -- DFPS --;

<u>Title page, Item [54] and Column 1, line 7,</u>
Change "EPGAS" to -- FPGAS --;

<u>Column 4,</u>
Line 22, after "protocol" begin a new paragraph;

<u>Column 6,</u>
Line 32, after "acknowledgement" insert -- to --;
Line 47, change "UNIT. This" to -- UNIT, which --;

<u>Column 18,</u>
Line 57, change "received" to -- receive --.

Signed and Sealed this

Twenty-sixth Day of August, 2003

JAMES E. ROGAN
*Director of the United States Patent and Trademark Office*